(12) United States Patent
Kim et al.

(10) Patent No.: US 11,469,787 B2
(45) Date of Patent: Oct. 11, 2022

(54) DIVIDER FOR DIVIDING WIRELESS SIGNALS IN A WIRELESS COMMUNICATION SYSTEM AND A WIRELESS DEVICE USING THE SAME

(71) Applicants: LG ELECTRONICS INC., Seoul (KR); KOREA ADVANCED INSTITUTE OF SCIENCE AND TECHNOLOGY, Daejeon (KR)

(72) Inventors: Dangoh Kim, Sejong (KR); Jaehoon Chung, Seoul (KR); Sangrim Lee, Seoul (KR); Dongho Cho, Seoul (KR); Juyong Lee, Daejeon (KR); Seungwon Keum, Daejeon (KR); Seongjae Kim, Daejeon (KR); Sangmi Noh, Daejeon (KR)

(73) Assignees: LG ELECTRONICS INC., Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 155 days.

(21) Appl. No.: 16/925,294

(22) Filed: Jul. 9, 2020

(65) Prior Publication Data
US 2022/0014226 A1    Jan. 13, 2022

(51) Int. Cl.
*H04B 1/40* (2015.01)
*H01P 5/19* (2006.01)
*H01Q 15/04* (2006.01)

(52) U.S. Cl.
CPC ............... *H04B 1/40* (2013.01); *H01P 5/19* (2013.01); *H01Q 15/04* (2013.01)

(58) Field of Classification Search
CPC ........ H04B 1/0005; H04B 1/0064; H04B 1/38; H04B 1/40; H04B 7/04; H04B 7/0404; H04P 5/18; H04Q 15/14; H04Q 15/04
USPC .......... 375/219, 220, 222, 260; 455/39, 500, 455/63.4, 73, 88
See application file for complete search history.

(56) References Cited

U.S. PATENT DOCUMENTS

| | | | | |
|---|---|---|---|---|
| 3,218,580 A | * | 11/1965 | Zanichkowsky | ......... H01P 5/12 343/778 |
| 4,968,958 A | * | 11/1990 | Hoare | ........................ H01P 5/12 333/128 |
| 8,040,204 B2 | * | 10/2011 | Brown | ....................... H01P 5/16 333/136 |
| 10,658,727 B1 | * | 5/2020 | Foti | ............................ H01P 5/12 |
| 2014/0266962 A1 | * | 9/2014 | Dupuy | ................... H03D 11/04 333/125 |

FOREIGN PATENT DOCUMENTS

JP          2017049595 A   *  3/2017

* cited by examiner

*Primary Examiner* — Young T. Tse
(74) *Attorney, Agent, or Firm* — Lee Hong Degerman Kang Waimey

(57) ABSTRACT

A divider for dividing a radio signal includes an input port, a plurality of output ports and a cavity having one surface coupled to the input port and other surface coupled to the plurality of output ports. The other surface is formed as a curved surface, and the plurality of output ports is disposed on the other surface at certain intervals. The side of the cavity is slantly formed from the one surface to the other surface at a certain angle. The distances between the input port and the plurality of output ports is the same.

8 Claims, 35 Drawing Sheets

(a)

(b)

(a)

(b)

DIVIDER FOR DIVIDING WIRELESS SIGNALS IN A WIRELESS COMMUNICATION SYSTEM AND A WIRELESS DEVICE USING THE SAME

BACKGROUND OF THE INVENTION

Field of the Invention

The present disclosure relates to a divider for dividing a radio signal in a wireless communication system and a wireless apparatus using the same.

Related Art

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wideband, and device networking, are researched.

SUMMARY OF THE INVENTION

An embodiment of the present disclosure proposes a divider for dividing a radio signal.

An object of a divider coupled to an array antenna is to provide an array device of the antenna with RF signals and power having the same size and phase. The existing divider may be implemented in the form of a transmission line of a metal pattern, such as a microstrip or a co-planar waveguide (CPW) on a PCB, may be implemented in the form of a transmission line of a metal waveguide, or may be implemented as a structure, such as a substrate integrated waveguide (SIW) for generating a structure similar to that of a waveguide using a metal surface and a via within a PCB dielectric substrate.

The existing divider is implemented in a form in which a T-junction of a 2-branch form having an easy impedance matching characteristic and a simple design is repeated. Such a form is commonly used because it has a very small number of design variables and only a small number of T-junction structures have only to be designed. Furthermore, an H-junction form in which the T-junction having a direction thereof changed in a vertical/horizontal form not in a single direction is repeated is also used.

Conventional power-feeding network technologies can be easily designed and fabricated in a PCB form using dielectrics, but have a very great loss component according to a path length on a PCB in a frequency band of several tens or several hundreds of GHz. In the technologies, an array structure which may be implemented in a flat panel form structure may be applied to only a 1-dimensional linear array form implemented on a flat panel. 1) The conventional technology has a disadvantage in that it limits the array structure of an array antenna. 2) A waveguide transmission line form having a low loss characteristic has a very small loss, but it requires additional conversion devices in order to implement an array structure to be applied to an array antenna due to a propagation mode and direction of a waveguide. Furthermore, the waveguide transmission line form has a disadvantage of a high level of fabrication difficulty attributable to ultra-small size metal processing fabrication compared to the PCB. 3) In general, the aforementioned conventional power-feeding network has a critical point in that it can be applied to only a limited array structure, such as a 1*2N or 2N*2N array structure, because a 2-branch power divider is repeated. Among the conventional power-feeding network technologies, an N-way divider based on a waveguide form for branching high RF power is used, but it is not suitable for applying a shape of the corresponding divider to the array antenna.

Accordingly, an embodiment of the present disclosure proposes a divider capable of solving problems, such as a loss, an array structure, and complexity of a power-feeding network for distributing a signal and power to a massive array antenna.

Technical problems to be solved by the present disclosure are not limited by the above-mentioned technical problems, and other technical problems which are not mentioned above can be clearly understood from the following description by those skilled in the art to which the present disclosure pertains.

In an aspect, a divider for dividing a radio signal includes an input port, a plurality of output ports and a cavity having one surface coupled to the input port and other surface coupled to the plurality of output ports.

The other surface is formed as a curved surface, and the plurality of output ports is disposed on the other surface at certain intervals. The side of the cavity is slantly formed from the one surface to the other surface at a certain angle. The distances between the input port and the plurality of output ports is the same.

The inside of the cavity may be made of metal.

The curved surface may have a three-dimensional (3D)-shaped surface based on a shape of one surface of a specific lens.

The input port may be positioned at a focal point of the specific lens.

The plurality of output ports may be disposed on the 3D-shaped surface based on a certain number of output ports as a unit.

The divider may further include a barrier rib positioned between adjacent output ports of the plurality of output ports.

The plurality of output ports may have different areas.

The plurality of output ports has a first area or a second area different from the first area. An output port having the first area and an output port having the second area may be alternately disposed within the unit.

After the output ports having the first area are continuously disposed in a way to be adjacent to each other within the unit, the output port having the second area may be disposed.

In another aspect, one or more antennas for transmitting or receiving a radio are coupled to a divider for dividing a radio signal.

The divider includes an input port, a plurality of output ports and a cavity having one surface coupled to the input port and other surface coupled to the plurality of output ports.

The other surface is formed as a curved surface, and the plurality of output ports is disposed on the other surface at certain intervals. The side of the cavity is slantly formed from the one surface to the other surface at a certain angle. The distances between the input port and the plurality of output ports is the same.

The inside of the cavity may be made of metal.

The curved surface may have a three-dimensional (3D)-shaped surface based on a shape of one surface of a specific lens.

The input port may be positioned at a focal point of the specific lens.

The plurality of output ports may be disposed on the 3D-shaped surface based on a certain number of output ports as a unit.

The divider may further include a barrier rib positioned between adjacent output ports of the plurality of output ports.

The plurality of output ports may have different areas.

The plurality of output ports has a first area or a second area different from the first area. An output port having the first area and an output port having the second area may be alternately disposed within the unit.

After the output ports having the first area are continuously disposed in a way to be adjacent to each other within the unit, the output port having the second area may be disposed.

In another aspect, an apparatus for transmitting or receiving a radio signal in a wireless communication system includes one or more antennas, one or more transceivers configured to transmit or receive the radio signal through the one or more antennas, and one or more dividers configured to divide an output signal of the one or more transceivers and output the divided signals to the one or more antennas.

The divider includes an input port, a plurality of output ports and a cavity having one surface coupled to the input port and other surface coupled to the plurality of output ports.

The other surface is formed as a curved surface, and the plurality of output ports is disposed on the other surface at certain intervals. The side of the cavity is slantly formed from the one surface to the other surface at a certain angle. The distances between the input port and the plurality of output ports is the same.

The curved surface may have a three-dimensional (3D)-shaped surface based on a shape of one surface of a specific lens.

BRIEF DESCRIPTION OF THE DRAWINGS

The accompanying drawings, which are included to provide a further understanding of the invention and are incorporated in and constitute a part of this specification, exemplarily represent embodiments of the invention and together with the description serve to explain the principles of the invention. In the drawings.

DESCRIPTION OF EXEMPLARY EMBODIMENTS

Figure 1:
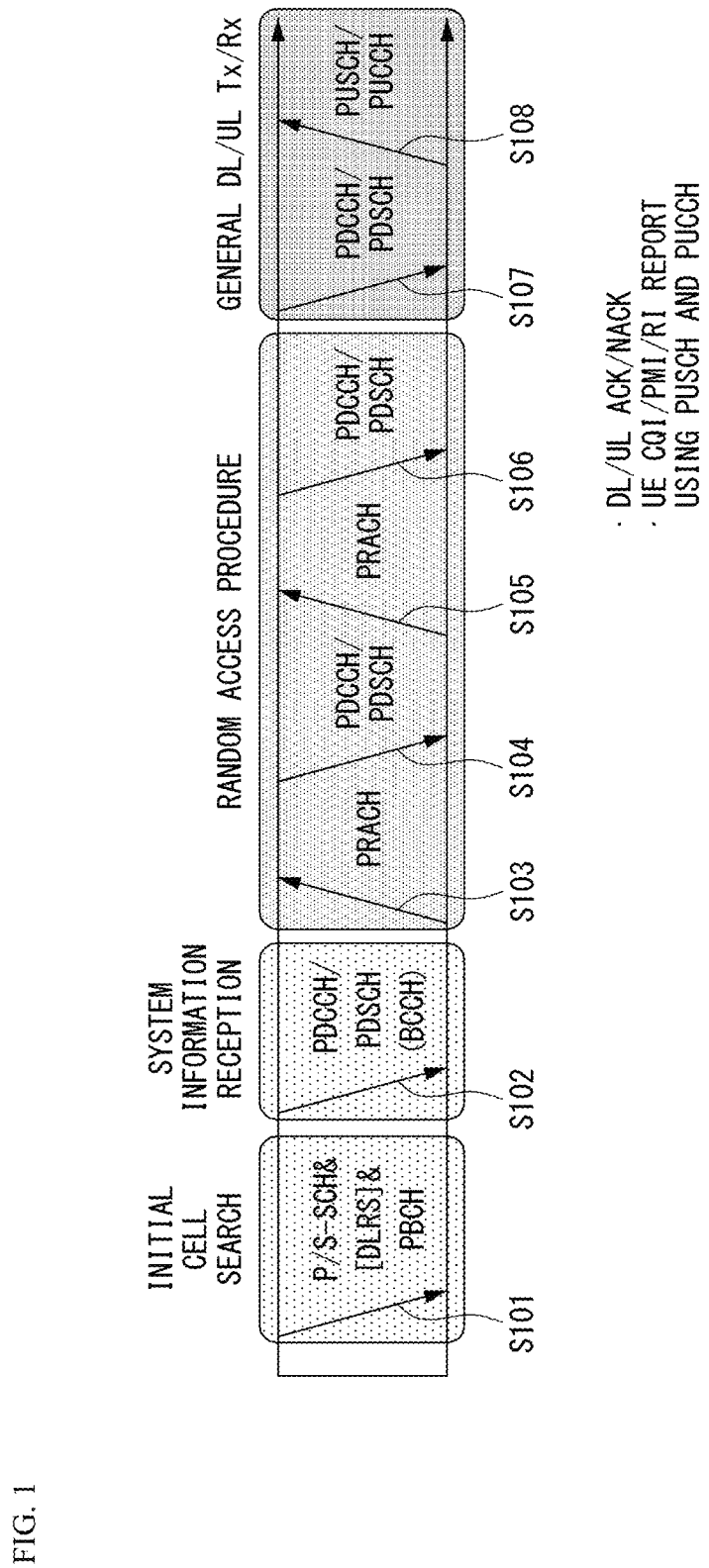
FIG. 1 illustrates physical channels and general signal transmission used in a 3GPP system.

Hereinafter, embodiments disclosed in the present specification will be described in detail with reference to the accompanying drawings, but the same or similar components are denoted by the same and similar reference numerals, and redundant descriptions thereof will be omitted. The suffixes "module" and "unit" for components used in the following description are given or used interchangeably in consideration of only the ease of preparation of the specification, and do not have meanings or roles that are distinguished from each other by themselves. In addition, in describing the embodiments disclosed in the present specification, when it is determined that a detailed description of related known technologies may obscure the subject matter of the embodiments disclosed in the present specification, the detailed description thereof will be omitted. In addition, the accompanying drawings are for easy understanding of the embodiments disclosed in the present specification, and the technical idea disclosed in the present specification is not limited by the accompanying drawings, and all modifications included in the spirit and scope of the present invention, It should be understood to include equivalents or substitutes.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

For clarity, the description is based on a 3GPP communication system (eg, LTE, NR, etc.), but the technical idea of the present invention is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. 3GPP 6G may mean technology after TS Release 17 and/or Release 18. "xxx" means standard document detail number. LTE/NR/6G may be collectively referred to as a 3GPP system. Background art, terms, abbreviations, and the like used in the description of the present invention may refer to matters described in standard documents published before the present invention. For example, you can refer to the following document:

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification
Physical Channel and Frame Structure
Physical Channels and General Signal Transmission FIG. 1 illustrates physical channels and general signal transmission used in a 3GPP system. In a wireless communication system, a terminal receives information from a base station through a downlink (DL), and the terminal transmits information to the base station through an uplink (UL). The information transmitted and received by the base station and the terminal includes data and various control information, and various physical channels exist according to the type/use of information transmitted and received by them.

When the terminal is powered on or newly enters a cell, the terminal performs an initial cell search operation such as synchronizing with the base station (S101). To this end, the UE receives a Primary Synchronization Signal (PSS) and a Secondary Synchronization Signal (SSS) from the base station to synchronize with the base station and obtain information such as cell ID. Thereafter, the terminal may receive a physical broadcast channel (PBCH) from the base station to obtain intra-cell broadcast information. Meanwhile, the UE may receive a downlink reference signal (DL RS) in the initial cell search step to check a downlink channel state.

After completing the initial cell search, the UE receives a physical downlink control channel (PDCCH) and a physical downlink shared channel (PDSCH) according to the information carried on the PDCCH, thereby receiving a more specific system Information can be obtained (S102).

On the other hand, when accessing the base station for the first time or when there is no radio resource for signal transmission, the terminal may perform a random access procedure (RACH) for the base station (S103 to S106). To this end, the UE transmits a specific sequence as a preamble through a physical random access channel (PRACH) (S103 and S105), and a response message to the preamble through a PDCCH and a corresponding PDSCH (RAR (Random Access Response) message) In the case of contention-based RACH, a contention resolution procedure may be additionally performed (S106).

After performing the above-described procedure, the UE receives PDCCH/PDSCH (S107) and physical uplink shared channel (PUSCH)/physical uplink control channel as a general uplink/downlink signal transmission procedure. (Physical Uplink Control Channel; PUCCH) transmission (S108) can be performed. In particular, the terminal may receive downlink control information (DCI) through the PDCCH. Here, the DCI includes control information such as resource allocation information for the terminal, and different formats may be applied according to the purpose of use.

On the other hand, control information transmitted by the terminal to the base station through uplink or received by the terminal from the base station is a downlink/uplink ACK/NACK signal, a channel quality indicator (CQI), a precoding matrix index (PMI), and (Rank Indicator) may be included. The terminal may transmit control information such as CQI/PMI/RI described above through PUSCH and/or PUCCH.

Structure of Uplink and Downlink Channels

Downlink Channel Structure

The base station transmits a related signal to the terminal through a downlink channel to be described later, and the terminal receives a related signal from the base station through a downlink channel to be described later.

(1) Physical Downlink Shared Channel (PDSCH)

PDSCH carries downlink data (eg, DL-shared channel transport block, DL-SCH TB), and includes Quadrature Phase Shift Keying (QPSK), Quadrature Amplitude Modulation (QAM), 64 QAM, 256 QAM, etc. The modulation method is applied. A codeword is generated by encoding TB. The PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 Control Channel Elements (CCEs) according to the Aggregation Level (AL). One CCE consists of 6 REGs (Resource Element Group). One REG is defined by one OFDM symbol and one (P)RB.

The UE acquires DCI transmitted through the PDCCH by performing decoding (aka, blind decoding) on the set of PDCCH candidates. The set of PDCCH candidates decoded by the UE is defined as a PDCCH search space set. The search space set may be a common search space or a UE-specific search space. The UE may acquire DCI by monitoring PDCCH candidates in one or more search space sets set by MIB or higher layer signaling.

Uplink Channel Structure

The terminal transmits a related signal to the base station through an uplink channel to be described later, and the base station receives a related signal from the terminal through an uplink channel to be described later.

(1) Physical Uplink Shared Channel (PUSCH)

PUSCH carries uplink data (eg, UL-shared channel transport block, UL-SCH TB) and/or uplink control information (UCI), and CP-OFDM (Cyclic Prefix-Orthogonal Frequency Division Multiplexing) waveform (waveform), DFT-s-OFDM (Discrete Fourier Transform-spread-Orthogonal Frequency Division Multiplexing) is transmitted based on the waveform. When the PUSCH is transmitted based on the DFT-s-OFDM waveform, the UE transmits the PUSCH by applying transform precoding. For example, when transform precoding is not possible (eg, transform precoding is disabled), the UE transmits a PUSCH based on the CP-OFDM waveform, and when transform precoding is possible (eg, transform precoding is enabled), the UE is CP-OFDM. PUSCH may be transmitted based on a waveform or a DFT-s-OFDM waveform. PUSCH transmission is dynamically scheduled by the UL grant in the DCI or is semi-static based on higher layer (e.g., RRC) signaling (and/or Layer 1 (L1) signaling (e.g., PDCCH)). Can be scheduled (configured grant). PUSCH transmission may be performed based on a codebook or a non-codebook.

(2) Physical Uplink Control Channel (PUCCH)

The PUCCH carries uplink control information, HARQ-ACK, and/or scheduling request (SR), and may be divided into a plurality of PUCCHs according to the PUCCH transmission length.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 2:
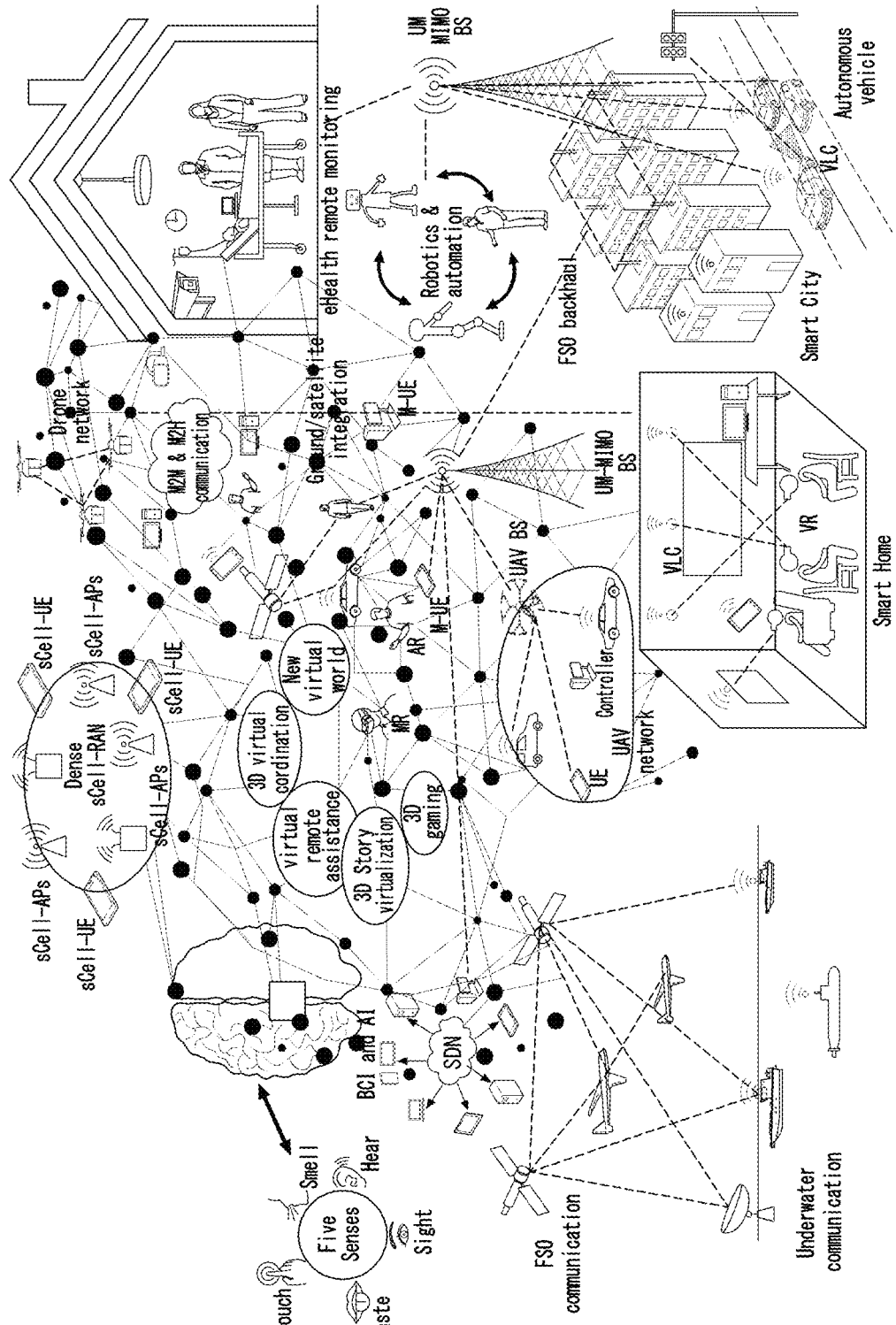
FIG. 2 is a view showing an example of a communication structure providable in a 6G system applicable to the present disclosure.

FIG. 2 is a view showing an example of a communication structure providable in a 6G system applicable to the present disclosure.

Figure 15:
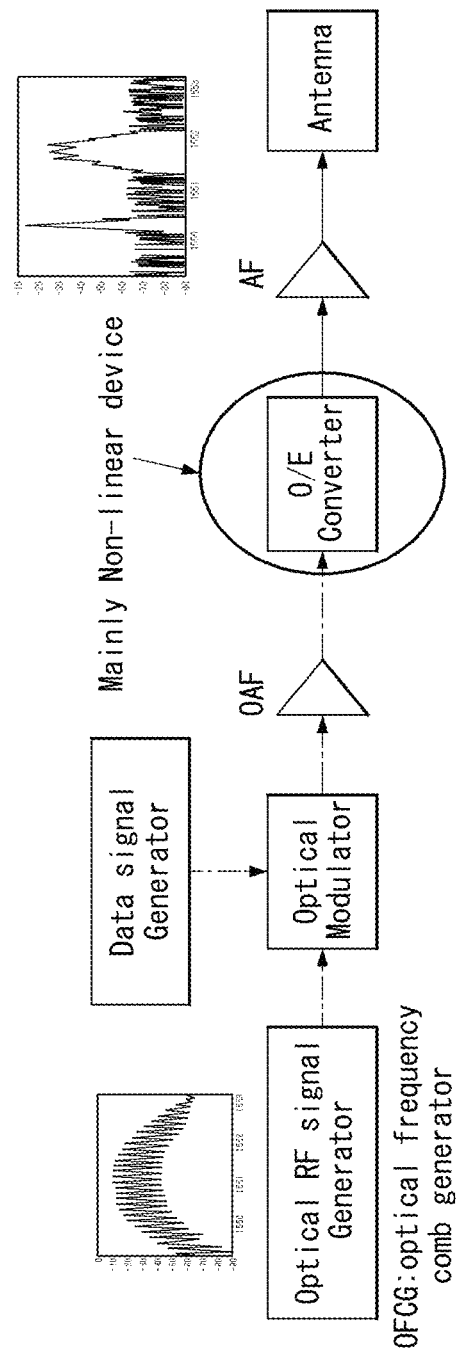
FIG. 15 is a view showing a transmitter structure applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-digestion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 3:
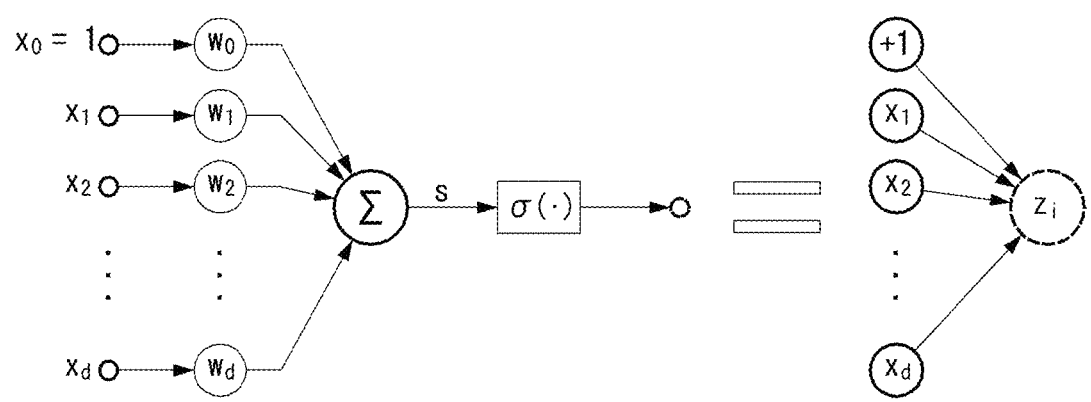
FIG. 3 illustrates a structure of a perceptron to which the method proposed in the present specification can be applied.

FIG. 3 illustrates a structure of a perceptron to which the method proposed in the present specification can be applied.

Referring to FIG. 3, when an input vector x=(x1, x2, . . . , xd) is input, each component is multiplied by a weight (W1, W2, . . . , Wd), and all the results are summed. After that, the entire process of applying the activation function σ(•) is called a perceptron. The huge artificial neural network structure may extend the simplified perceptron structure shown in FIG. 3 to apply input vectors to different multidimensional perceptrons. For convenience of explanation, an input value or an output value is referred to as a node.

Meanwhile, the perceptron structure illustrated in FIG. 3 may be described as being composed of a total of three layers based on an input value and an output value. An artificial neural network in which H (d+1) dimensional perceptrons exist between the 1st layer and the 2nd layer, and K (H+1) dimensional perceptrons exist between the 2nd layer and the 3rd layer, as shown in FIG. 4.

Figure 4:
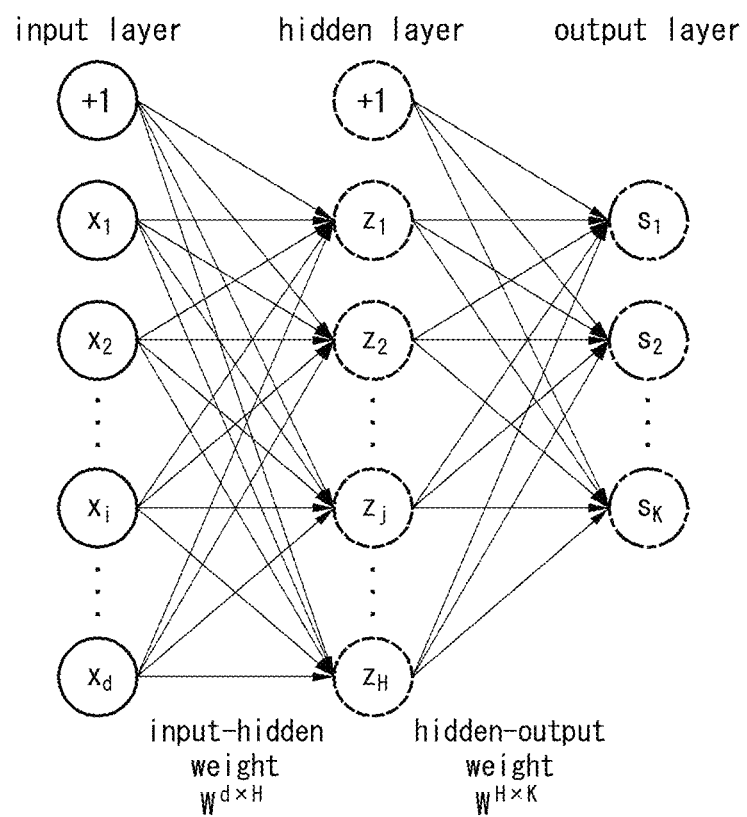
FIG. 4 illustrates the structure of a multilayer perceptron to which the method proposed in the present specification can be applied.

FIG. 4 illustrates the structure of a multilayer perceptron to which the method proposed in the present specification can be applied.

The layer where the input vector is located is called an input layer, the layer where the final output value is located is called the output layer, and all layers located between the input layer and the output layer are called a hidden layer. In the example of FIG. 4, three layers are disclosed, but since the number of layers of the artificial neural network is counted excluding the input layer, it can be viewed as a total of two layers. The artificial neural network is constructed by connecting the perceptrons of the basic blocks in two dimensions.

The above-described input layer, hidden layer, and output layer can be jointly applied in various artificial neural network structures such as CNN and RNN to be described later as well as multilayer perceptrons. The greater the number of hidden layers, the deeper the artificial neural network is, and the machine learning paradigm that uses the deep enough artificial neural network as a learning model is called Deep Learning. In addition, the artificial neural network used for deep learning is called a deep neural network (DNN).

Figure 5:
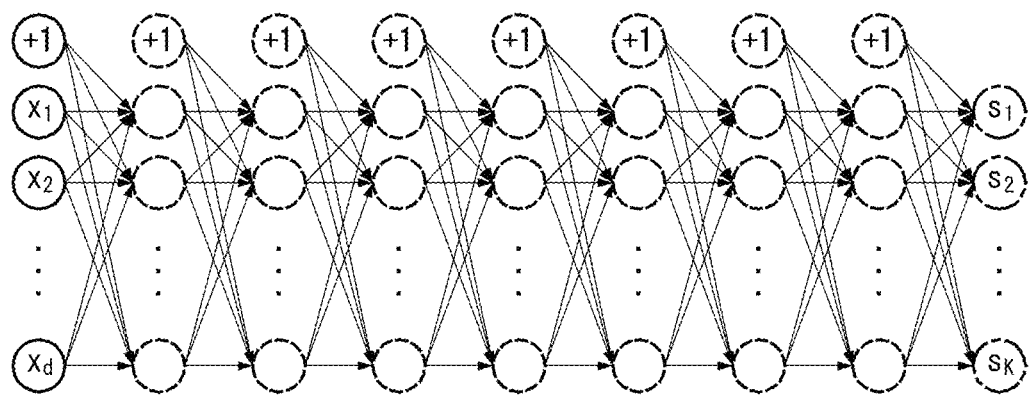
FIG. 5 illustrates a structure of a deep neural network to which the method proposed in the present specification can be applied.

FIG. 5 illustrates a structure of a deep neural network to which the method proposed in the present specification can be applied.

The deep neural network shown in FIG. 5 is a multilayer perceptron composed of eight hidden layers+output layers. The multilayer perceptron structure is expressed as a fully-connected neural network. In a fully connected neural network, a connection relationship does not exist between nodes located on the same layer, and a connection relationship exists only between nodes located on adjacent layers. DNN has a fully connected neural network structure and is composed of a combination of multiple hidden layers and activation functions, so it can be usefully applied to understand the correlation characteristics between input and output. Here, the correlation characteristic may mean a joint probability of input/output.

'On the other hand, depending on how the plurality of perceptrons are connected to each other, various artificial neural network structures different from the aforementioned DNN can be formed.

In a DNN, nodes located inside one layer are arranged in a one-dimensional vertical direction. However, in FIG. 6, it may be assumed that w nodes are arranged in two dimensions, and h nodes are arranged in a two-dimensional manner (convolutional neural network structure of FIG. 6). In this case, since a weight is added per connection in the connection process from one input node to the hidden layer, a total of h×w weights must be considered. Since there are h×w nodes in the input layer, a total of h2w2 weights are required between two adjacent layers.

Figure 6:
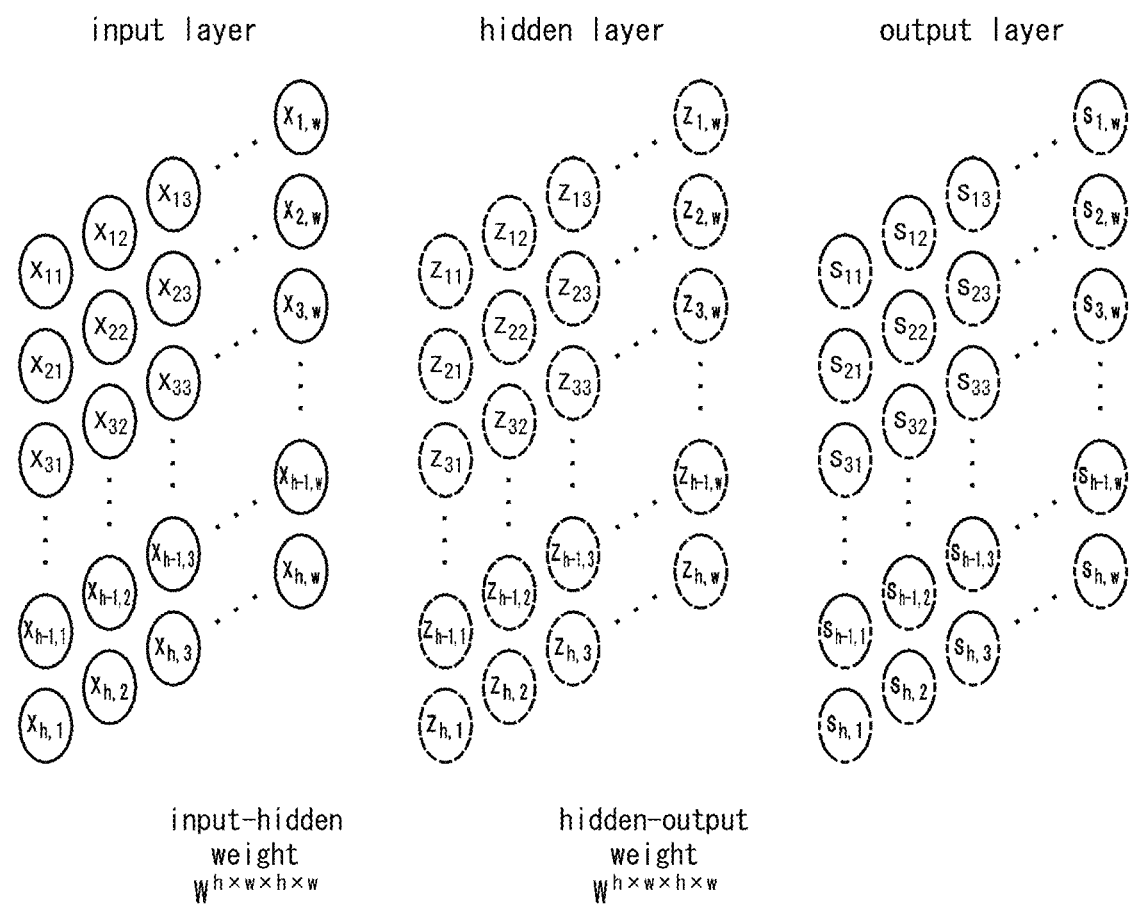
FIG. 6 illustrates the structure of a convolutional neural network to which the method proposed in the present specification can be applied.

FIG. 6 illustrates the structure of a convolutional neural network to which the method proposed in the present specification can be applied.

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

Figure 7:
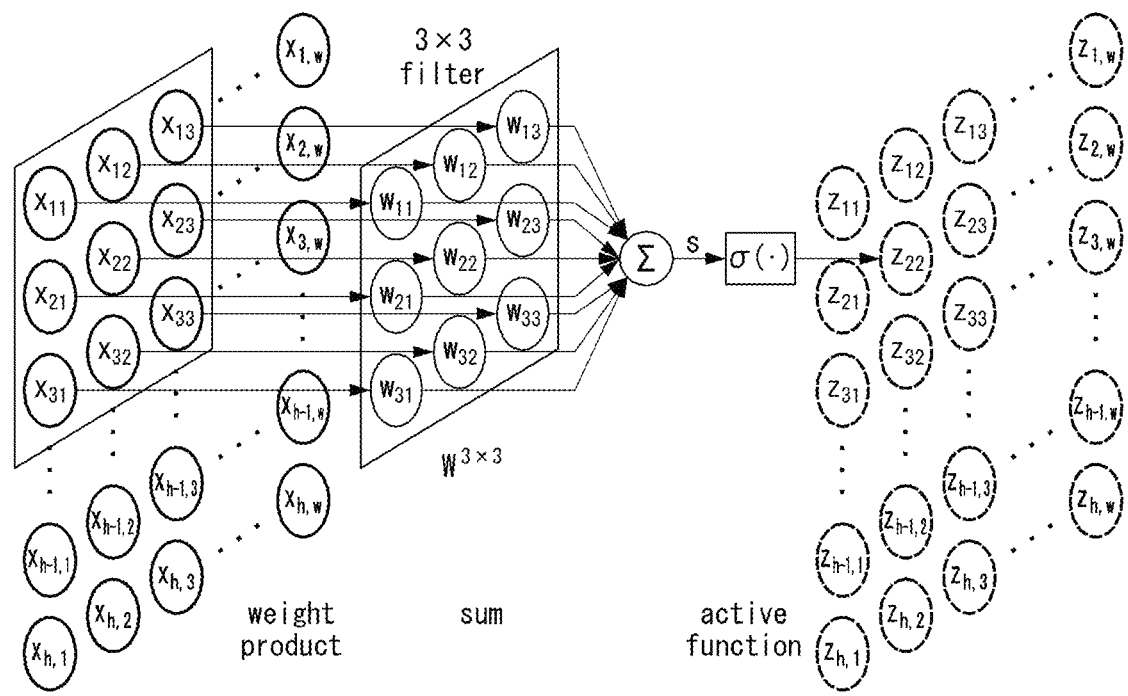
FIG. 7 illustrates a filter operation in a convolutional neural network to which the method proposed in the present specification can be applied.

FIG. 7 illustrates a filter operation in a convolutional neural network to which the method proposed in the present specification can be applied.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

Figure 8:
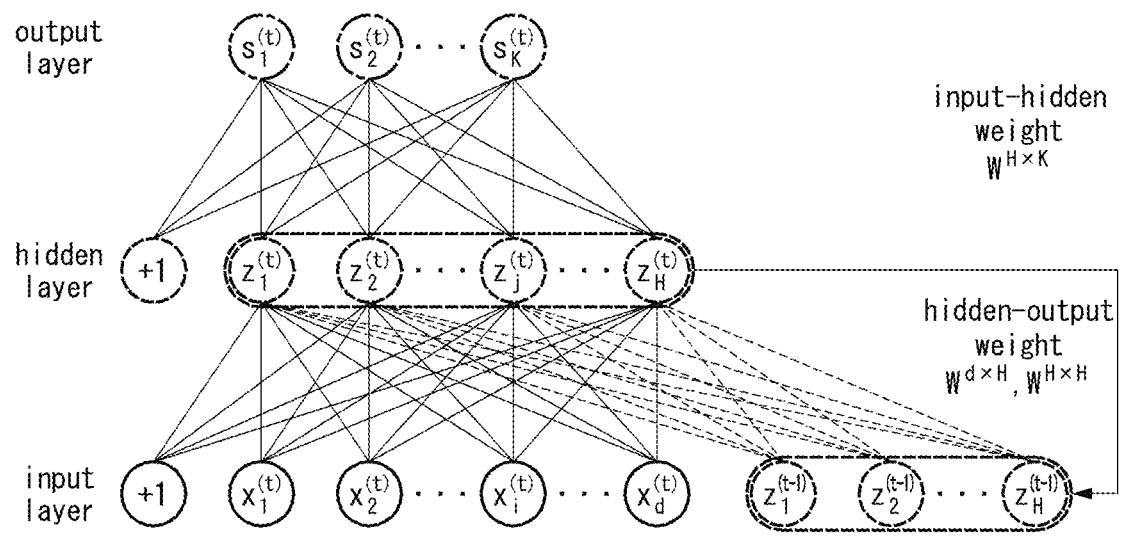
FIG. 8 illustrates a neural network structure in which a circular loop to which the method proposed in the present specification can be applied.

FIG. 8 illustrates a neural network structure in which a circular loop to which the method proposed in the present specification can be applied.

Referring to FIG. 8, a recurrent neural netwok (RNN) is a fully connected neural network with elements (x1(t), x2(t), . . . , xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

Figure 9:
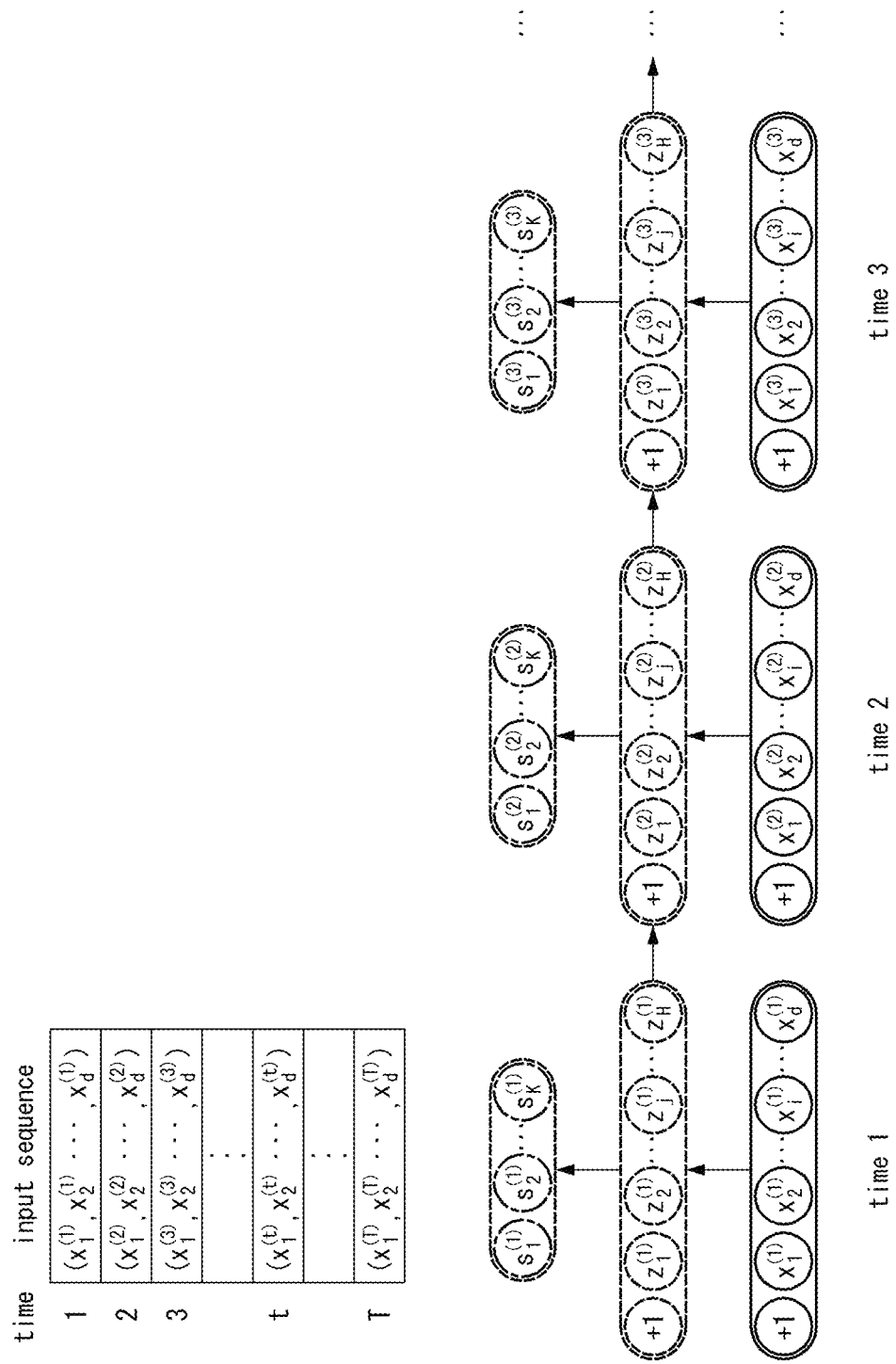
FIG. 9 illustrates an operation structure of a recurrent neural network to which the method proposed in the present specification can be applied.
Figure 10:
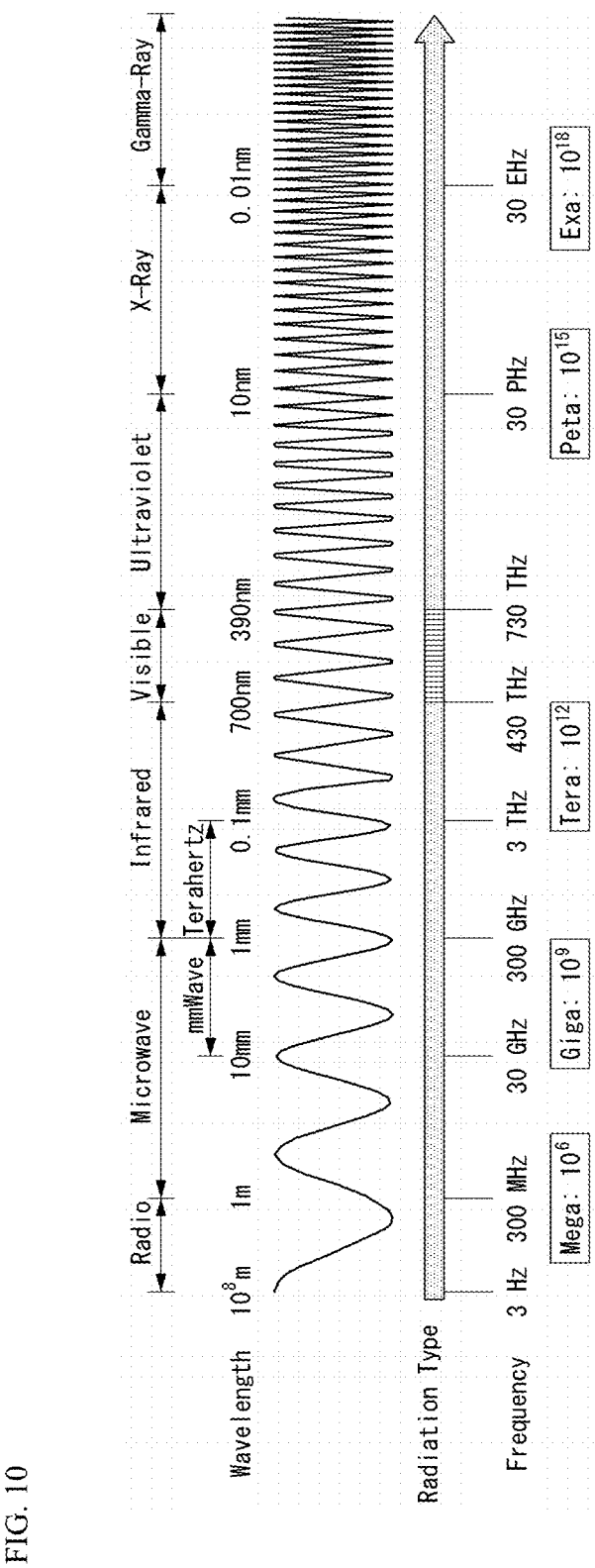
FIG. 10 is a view showing an electromagnetic spectrum applicable to the present disclosure.

FIG. 9 illustrates an operation structure of a recurrent neural network to which the method proposed in the present specification can be applied.

Referring to FIG. 9, the recurrent neural network operates in a predetermined order of time with respect to an input data sequence.

Hidden vectors (z1(1), z2(1), . . . , zH(1)) is input with the input vector (x1(2), x2(2), . . . , xd(2)) of the time point 2, and the vector (z1(2), z2(2), . . . , zH(2)) is determined. This process is repeatedly performed up to the time point 2, time point 3, . . . , time point T.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

In recent years, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver rather than a traditional communication framework in the fundamental signal processing and communication mechanism. For example, deep learning-based channel coding and decoding, deep learning-based signal estimation and detection, deep learning-based MIMO mechanism, AI-based resource scheduling, and It may include allocation and the like.

Terahertz (THz) Communication

THz communication is applicable to the 6G system. For example, a data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communications in General

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 11:
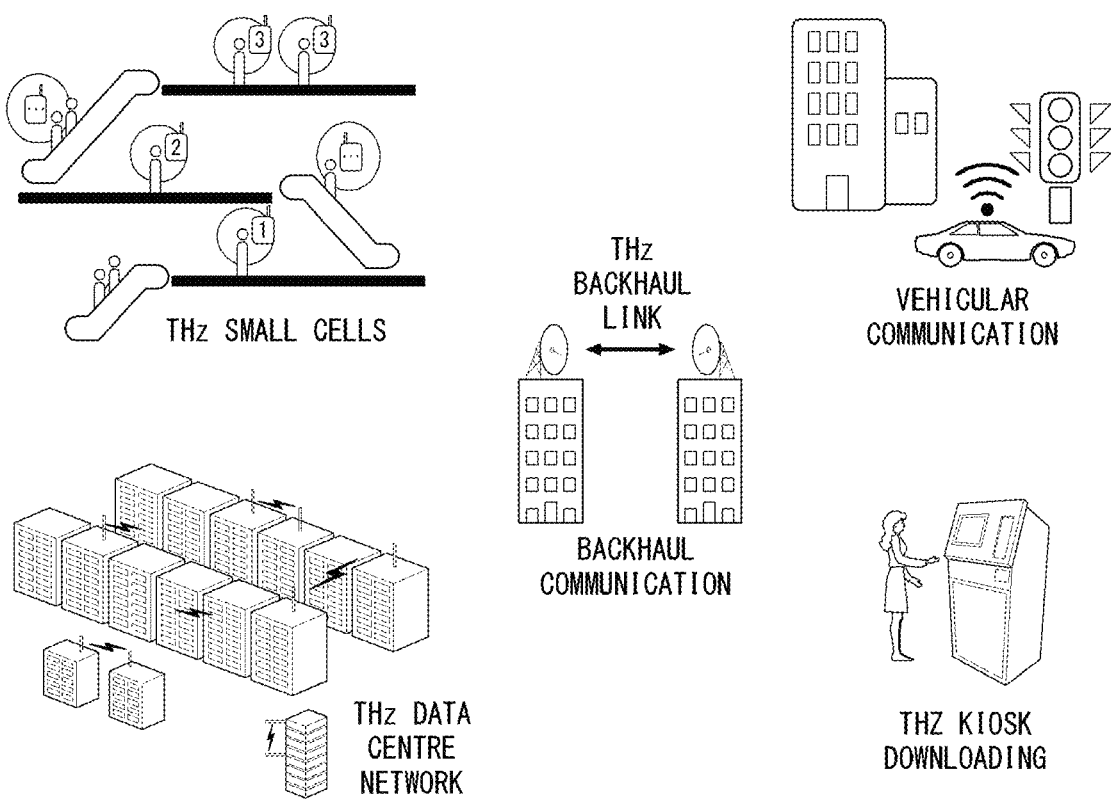
FIG. 11 is a view showing a THz communication method applicable to the present disclosure.

FIG. 11 is a view showing a THz communication method applicable to the present disclosure.

Referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below shows an example of technology which may be used in the THz wave.

TABLE 2

| Transceivers Device | Available immature: UTC-PD, RTD and SBD |
|---|---|
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The THz generation method can be classified as an optical device or an electronic device-based technology.

Figure 12:
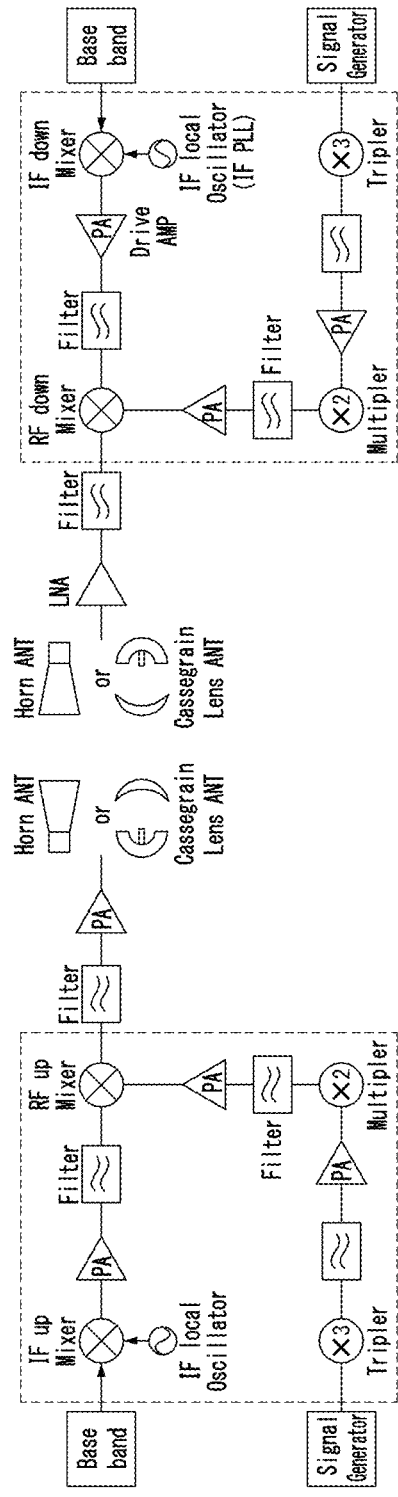
FIG. 12 is a view showing a THz wireless communication transceiver applicable to the present disclosure.

FIG. 12 is a view showing a THz wireless communication transceiver applicable to the present disclosure.

Figure 18:
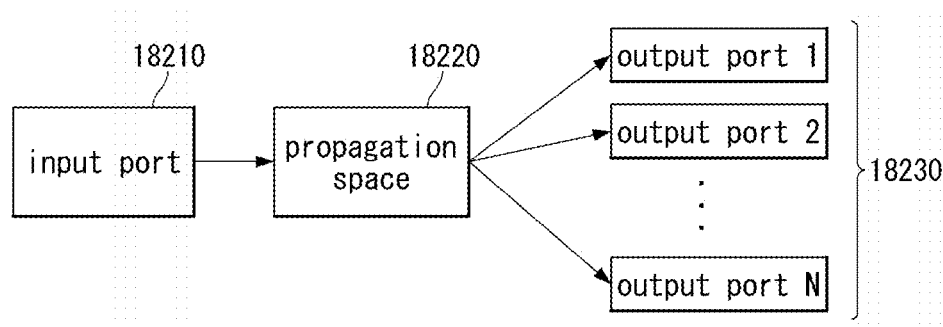
FIG. 18 illustrates a divider according to an embodiment of the present disclosure.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 13:
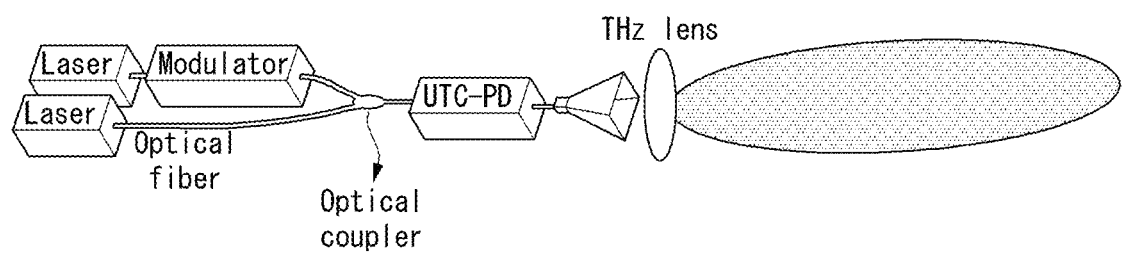
FIG. 13 is a view showing a THz signal generation method applicable to the present disclosure.
Figure 14:
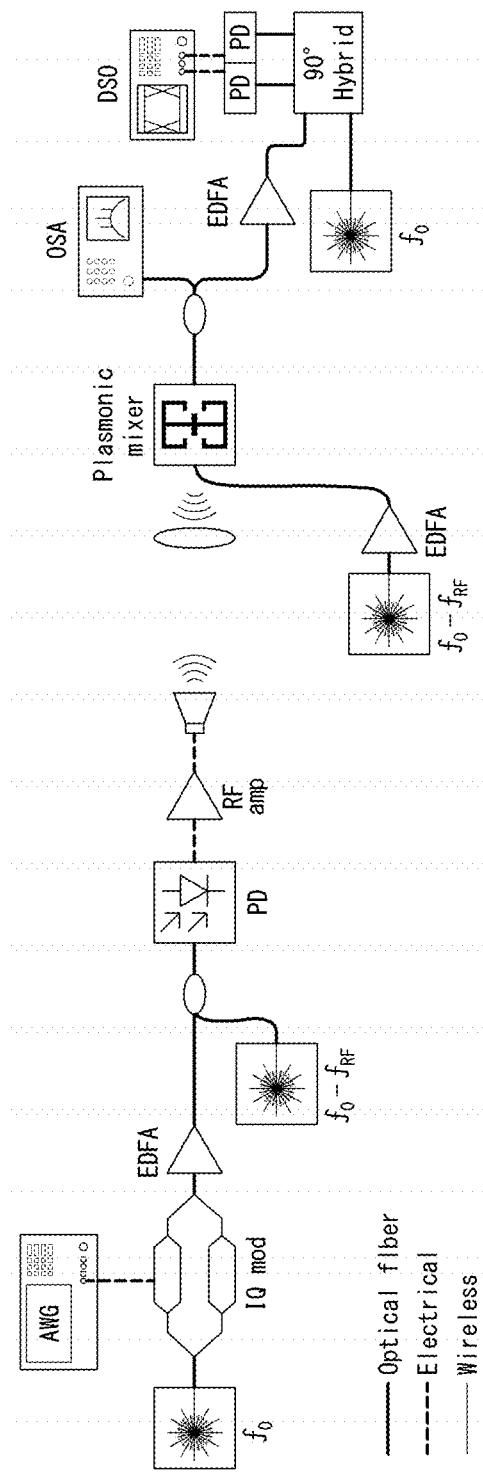
FIG. 14 is a view showing a wireless communication transceiver applicable to the present disclosure.

FIG. 13 is a view showing a THz signal generation method applicable to the present disclosure and FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 16:
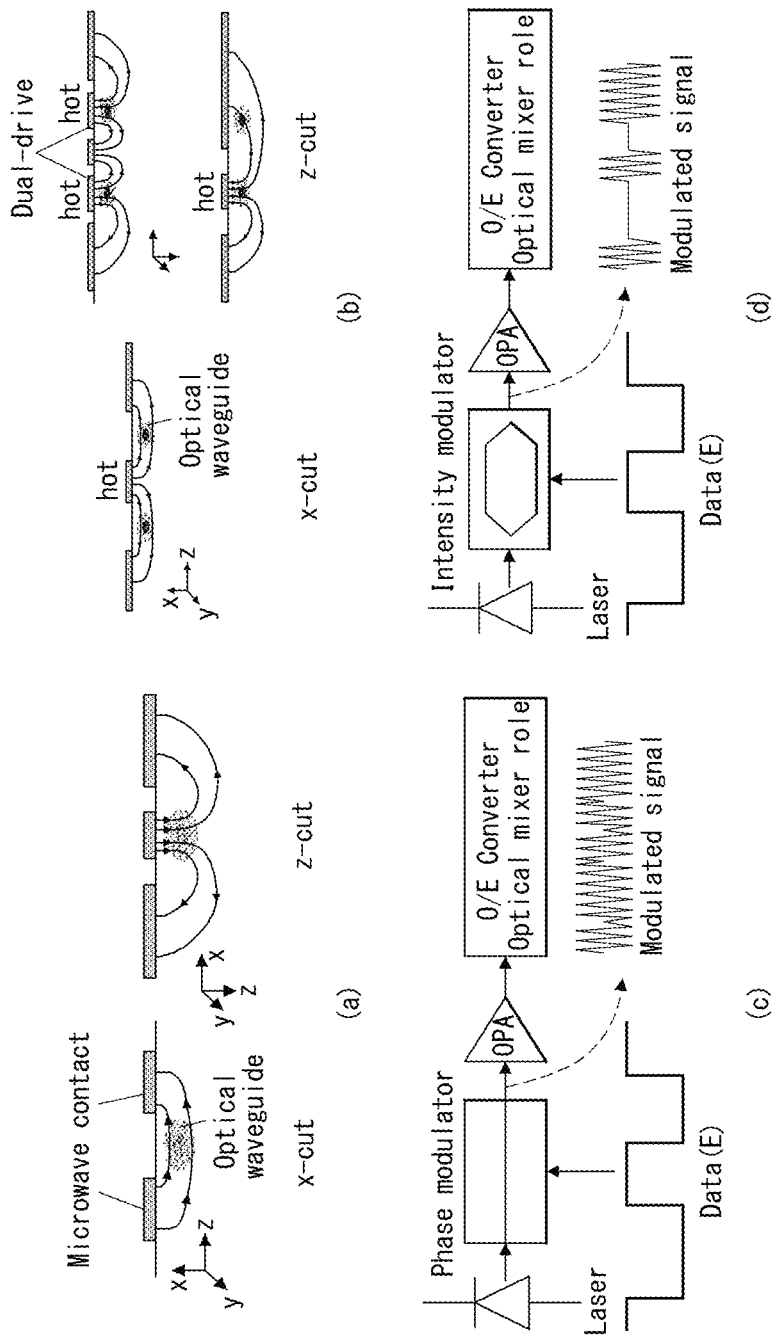
FIG. 16 is a view showing a modulator structure applicable to the present disclosure.

The structure of a photoelectric converter (or photoelectric converter) will be described with reference to FIGS. 15 and 16. FIG. 15 is a view showing a transmitter structure applicable to the present disclosure. FIG. 16 is a view showing a modulator structure applicable to the present disclosure.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

The aforementioned contents may be combined with subsequent embodiments proposed in the present disclosure and applied or may be supplemented to clarify technical characteristics of the embodiments proposed in the present disclosure. Hereinafter, the embodiments to be described hereinafter have been divided for convenience of description only, and some elements of any one embodiment may be substituted with some elements of another embodiment or may be mutually combined and applied.

Hereinafter, contents related to a conventional power-feeding network are described.

A conventional array antenna power-feeding network has an object of providing an array device of the antenna with RF signals and power having the same size and phase. The power-feeding network may be implemented in the form of a transmission line of a metal pattern, such as a microstrip or a co-planar waveguide (CPW) on a PCB, may be implemented in the form of a transmission line of a metal waveguide, or may be implemented as a structure, such as a substrate integrated waveguide (SIW) for generating a structure similar to that of a waveguide using a metal surface and a via within a PCB dielectric substrate.

The conventional power-feeding network has been implemented in a form in which a T-junction of a 2-branch form having an easy impedance matching characteristic and a simple design is repeated, and is chiefly classified as a corporate power-feeding network method. The power-feeding network is implemented in a form in which an impedance conversion structure is added by repeatedly disposing the corresponding T-junction after the 2-branch T-junction is designed. In general, the power-feeding network is used as the power-feeding network structure of an array antenna because it has a very small number of design variables and only a small number of T-junction structures have only to be designed. An H-junction form in which a T-junction having a direction thereof changed in a vertical/horizontal form not in a single direction is repeated is also used as the structure of the power-feeding network of an array antenna.

The conventional power-feeding network technologies can be easily designed and fabricated in a PCB form using dielectrics.

However, the conventional technology has the following problems and/or disadvantages.

1) The conventional technology has a very large loss component according to a path length on a PCB in a frequency band of several tens or several hundreds of GHz and may be applied to only a 1-dimensional linear array form implemented on a flat panel. That is, the conventional technology limits the array structure of an array antenna.

2) The conventional technology has a very low loss in a waveguide transmission line form having a low loss characteristic, but additionally requires separate conversion devices in order to implement an array structure to be applied to an array antenna due to a propagation mode and direction of a waveguide. Accordingly, the conventional technology has a disadvantage of a high level of fabrication difficulty attributable to ultra-small size metal processing fabrication compared to the PCB.

4) In general, the conventional power-feeding network has a critical point in that it is applied to only a limited array structure, such as a 1*2N or 2N*2N array structure, because a 2-branch power divider is repeated. Among the conventional power-feeding network technologies, an N-way divider based on a waveguide form for branching high RF power is used. However, the conventional power-feeding network has a critical point in that a shape of the N-way divider is not suitable for being applied to the array antenna.

In a mobile communication system or another radio wave application system using a radio wave of several tens or several hundreds of GHz, a high antenna gain is necessary. Furthermore, in a communication system, an array antenna using multiple beams or beam steering is essentially necessary. That is, in a wireless communication system, the number of array devices of an array antenna tends to be significantly increased. As described above, the conventional power-feeding network implementation method has a loss and problems and limits in an array structure.

Embodiments for solving the aforementioned problem are specifically described below.

Figure 17:
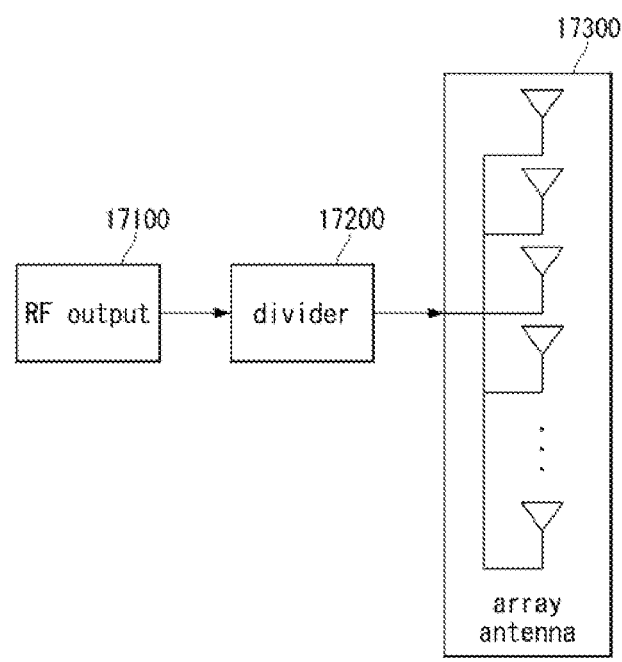
FIG. 17 illustrates a power-feeding network according to an embodiment of the present disclosure.

FIG. 17 illustrates a power-feeding network according to an embodiment of the present disclosure.

Referring to FIG. 17, the power-feeding network according to an embodiment of the present disclosure may include an RF output unit 17100, a divider 17200, and an array antenna 17300.

The power-feeding network may be included in an apparatus based on FIGS. 31 to 35. Specifically, the RF output unit 17100 may be based on a transceiver 106/206 of FIG. 32. The array antenna may be based on an antenna 108/208 of FIG. 32. The divider 17200 may divide the output signal of the transceiver 106/206 and output the divided signals to the antenna 108/208.

In the present disclosure, for convenience of description, a term "divider" is used based on the direction in which an input signal is output to the antenna, but this is not intended to limit the technological range. The "divider" may be denoted as a "synthesizer" based on a direction opposite the direction. That is, if the input port of the "divider" operates as an output port and an output port of the "divider" operates as an input port, the corresponding configuration may be denoted as a "synthesizer."

FIG. 18 illustrates a divider according to an embodiment of the present disclosure.

Referring to FIG. 18, the divider according to an embodiment of the present disclosure may include an input port 18210, a propagation space 18220, and output ports 18230.

Figure 32:
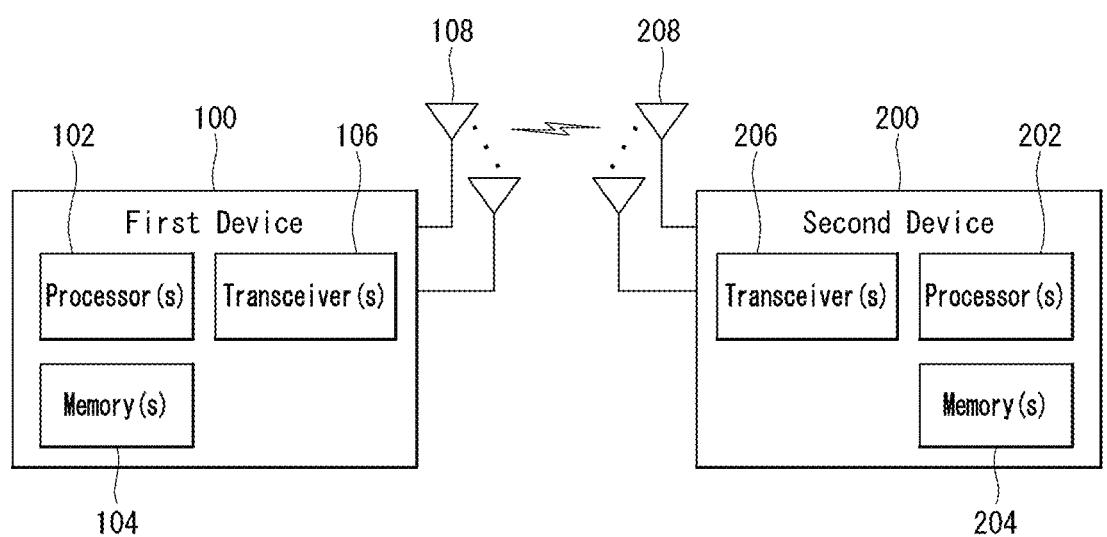
FIG. 32 illustrates wireless devices applicable to the present disclosure.

The output signal of the transceiver 106/206 of FIG. 32 may be received through the input port 18210.

As illustrated in FIG. 18, the output port 18230 may be formed plurally (e.g., N wherein N is a natural number). That is, the output ports 18230 may be based on a plurality of output ports.

The propagation space 18220 is a cavity in which a radio wave proceeds. The cavity may have one surface coupled to the input port 18210 and the other surface coupled to the plurality of output ports 18230. The cavity may be formed as a specific structure so that there is n radio wave that leaks to the outside.

According to an embodiment, the other surface may be formed as a curved surface, and the plurality of output ports may be disposed in the other surface at certain intervals. The side of the cavity may be slantly formed from the one surface to the other surface at a certain angle. The distances between the input port and the plurality of output ports may be the same.

According to an embodiment, the inside of the cavity may be made of metal, but the present disclosure is not limited thereto. The cavity may be formed based on a structure not having other radio wave leakage. For example, the inside of the cavity may be filled with dielectrics. For another example, the cavity may be based on a substrate integrated waveguide (SIW) or a PCB structure.

The output ports 18230 may operate similarly to a lens antenna. Specifically, the output ports 18230 may be disposed at a place formed as a curved surface or spherical surface within the cavity 18220, and may divide an RF power signal into N signal.

The following contents may be taken into consideration in relation to an implementation of the divider (or synthesizer) according to the present embodiment.

A detailed design and impedance matching of the output ports may be necessary so that radio waves can well proceed without reflection between the input port, a spherical surface propagation space, and the output ports.

Furthermore, the same distance between the input port and the output ports may be defined at the phase center location of each port, and may be determined based on shapes and operations of the input port and the output ports. In the input port, the size within the propagation space and an aperture shape of the port may be optimized depending on the number and deployment of the output ports. In the plurality of output ports, an isolation characteristic may be necessary between the output ports.

In addition, in the propagation space, an impedance matching and conversion technology needs to be applied so that an unnecessary reflection wave does not occur between the input port and the output ports.

Hereinafter, a structure of the divider according to an embodiment of the present disclosure is more specifically described with reference to FIGS. 19 to 21.

Figure 19:
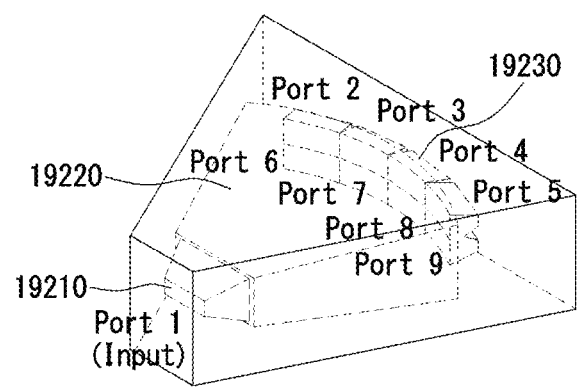
FIG. 19 is a diagram for describing the locations and propagation progress directions of the input and output ports of the divider according to an embodiment of the present disclosure.
Figure 19:
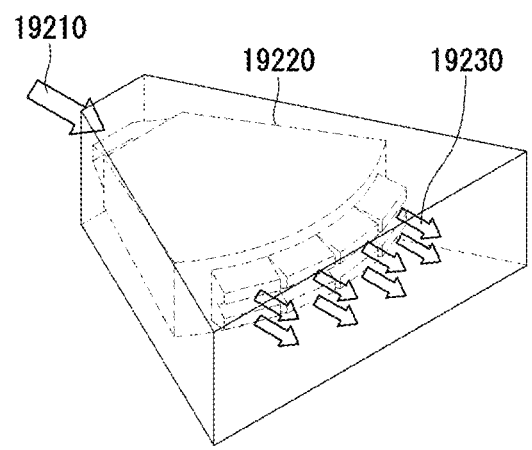

FIG. 19 is a diagram for describing the locations and propagation progress directions of the input and output ports of the divider according to an embodiment of the present disclosure.

(a) of FIG. 19 illustrates the locations of the input and output ports of the divider and a shape thereof. Referring to (a) of FIG. 19 the divider includes one input port 19210 (Port 1), a cavity 19220 in which radio waves proceed, and eight output ports 19230 (Ports 2~9).

The input port 19210 is positioned in one surface of the cavity 19220. The plurality of output ports 19230 is stacked in two stages in the other surface of the cavity 19220 formed as a curved surface using four output ports as a unit. In this case, the distance between the input port 19210 and the output ports 19230 is the same.

(b) of FIG. 19 illustrates a propagation progress direction through the divider. A signal (and/or power) is input to the divider through the input port 19210. The received signal (and/or power) is divided into 8 signals (and/or power) through the cavity 19220, and the 8 signals (and/or power) are output through the output ports 19230.

Figure 20:
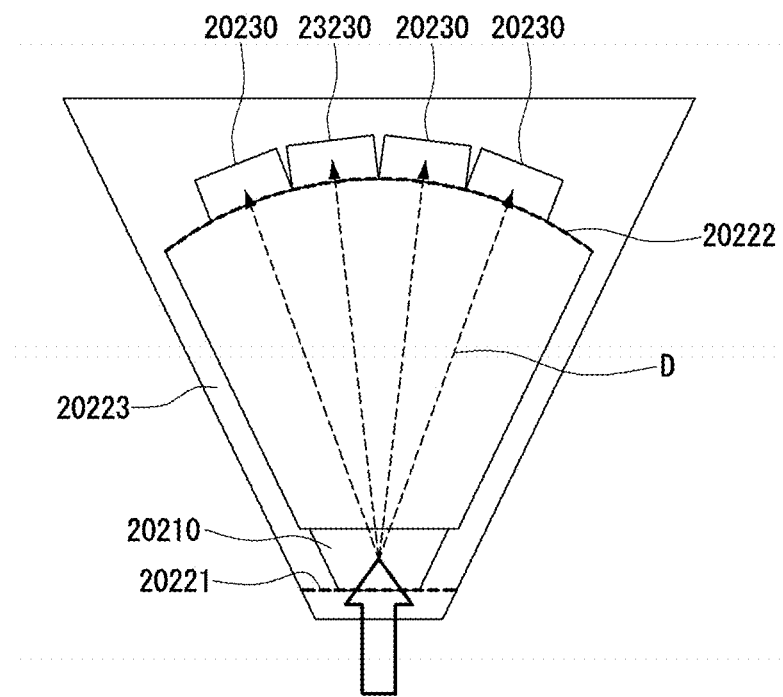
FIG. 20 is an example of a divider structure according to an embodiment of the present disclosure.

FIG. 20 is an example of a divider structure according to an embodiment of the present disclosure.

Specifically, FIG. 20 is a plan view of the divider of FIG. 19, which is viewed from the top.

Referring to FIG. 20, an input port 20210 is positioned in one surface 20221 of a cavity 20223. A plurality of (e.g., 8) output ports (e.g., 8 ports) 20230 is disposed in the other surface 20222 of the cavity. The distance D from the input port 20210 to the eight output ports 20230 is the same.

According to an embodiment, the other surface 20222 is formed as a curved surface, and the plurality of output ports 20230 may be disposed in the other surface 20222 at certain intervals. The side of the cavity 20223 may be slantly formed from the one surface 20221 to the other surface 20222 at a certain angle. The specific interval and the certain angle may be determined by taking into consideration impedance matching and a propagation arrival area to be described later.

According to an embodiment, the curved surface may be a three-dimensional (3D)-shaped surface based on a shape of one surface of a specific lens (e.g., convex lens). The input port 20210 may be positioned at a focal point of the specific lens.

The plurality of output ports 20230 may be disposed on the 3D-shaped surface using a specific number (e.g., 4) of output ports as a unit.

As described above, the output ports 20230 are disposed in the other surface 20222 of the cavity formed as the curved surface in a horizontal direction and a vertical direction. This is the same as that in which the output ports 20230 are disposed in some of the entire spherical surface having the same distance D as a radius. Accordingly, a signal (or power) input to the divider may be divided with the same size and phase. Furthermore, due to the structure, the divider according to the present embodiment may be coupled to an array antenna configured based on various numbers of antennas and/or various structures.

For the aforementioned operation, the removal of an unnecessary reflection wave in the cavity 20221, 20222, and 20223 and design factors that implement an isolation characteristic between the output ports 20230, in addition to impedance matching and conversion designs of the input port 20210 and the output port 20230, may be taken into consideration.

The divider illustrated in FIG. 20 has a structure in which the eight output ports 20230 are stacked on the other surface 20222 of the cavity having the four output ports 20230 as a unit. In this case, the output ports 20230 may be differently disposed. This is described below with reference to FIG. 21.

Figure 21:
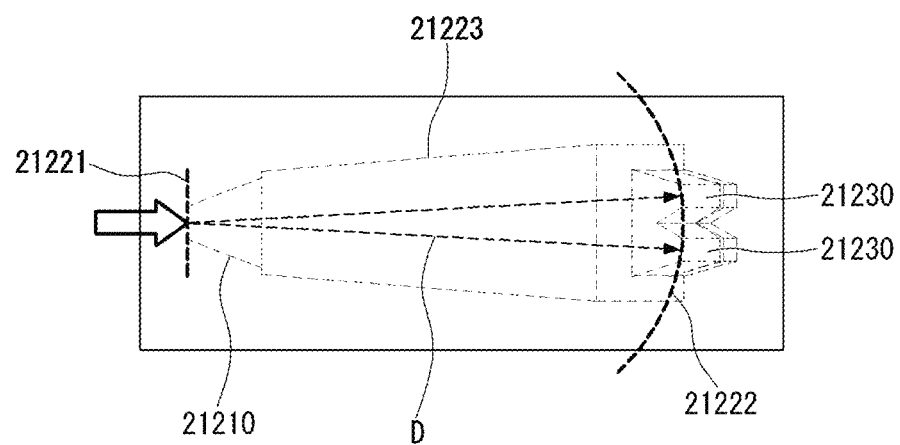
FIG. 21 illustrates a form of the divider structure according to an embodiment of the present disclosure, which is viewed from the side.

FIG. 21 illustrates a form of the divider structure according to an embodiment of the present disclosure, which is viewed from the side. Specifically, FIG. 21 is a side view of the divider of FIG. 19. Referring to FIG. 21, in the divider, a plurality of output ports 21230 of a cavity may be stacked on the other surface 21222 of the cavity, having two output ports 21230 as a unit, in multiple stages.

In FIG. 21, it is assumed that the plurality of output ports 21230 is equally disposed at certain intervals in a horizontal direction and a vertical direction. However, the output ports 21230 may be disposed at various locations within a limit in which the distance between the input ports 21210 is the same (i.e., on the other surface 21222 of the cavity).

Hereinafter, characteristics related to an operation of the divider according to an embodiment of the present disclosure or contents to be considered upon divider design are specifically described with reference to FIGS. 22 to 28.

Figure 22:
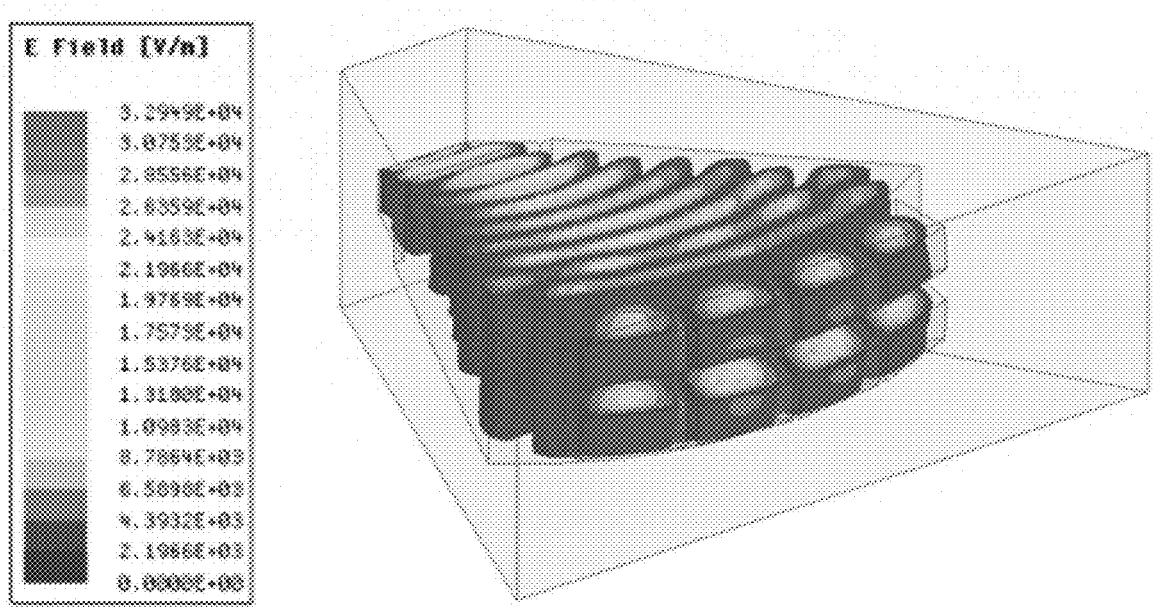
FIG. 22 is a diagram illustrating a distribution of electric fields according to an operation of the divider according to an embodiment of the present disclosure.
Figure 22:
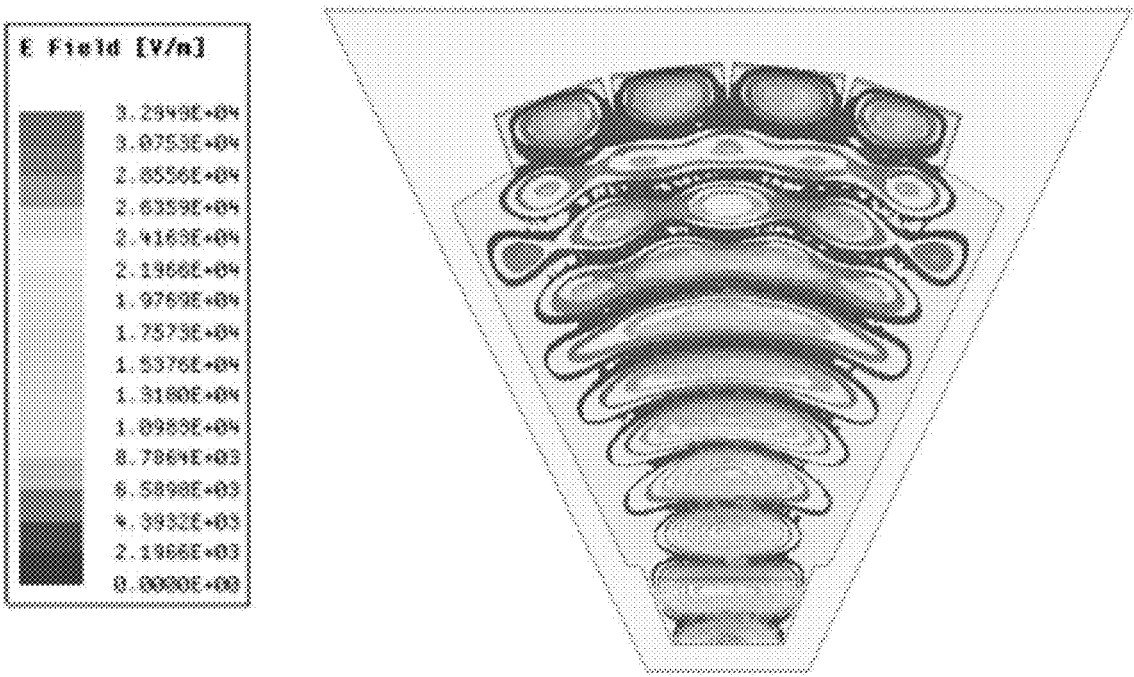

FIG. 22 is a diagram illustrating a distribution of electric fields according to an operation of the divider according to an embodiment of the present disclosure. Referring to FIG. 22, an input radio wave from an input port passes through a progress cavity, and is divided into eight output ports with the same size and the same phase. Related detailed operation characteristics are described with reference to FIG. 23.

Figure 23:
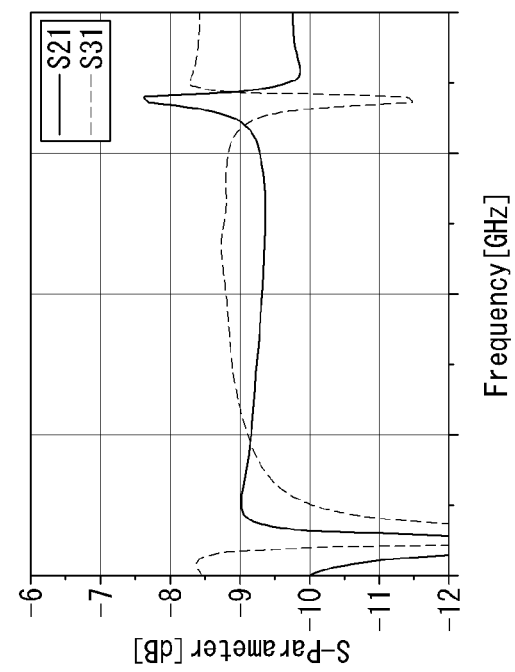
FIG. 23 is a graph illustrating a reflection loss and transfer characteristic of the divider according to an embodiment of the present disclosure.
Figure 23:
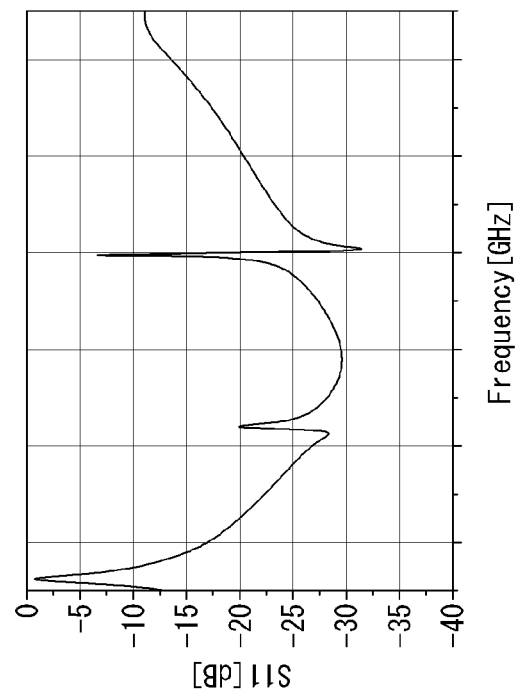

FIG. 23 is a graph illustrating a reflection loss and transfer characteristic of the divider according to an embodiment of the present disclosure.

Referring to (a) of FIG. 23 the divider according to the present embodiment shows a reflection loss characteristic of −25 dB or less. An impedance matching characteristic of the input ports can be seen from the graph.

Referring to fb) of FIG. 23, a transfer characteristic from the input port to the output ports shows a value of ±0.6 dB or less in −9 dB, that is, an ideal 8-branch divider result. It can be seen that signals having the same size are divided from the output ports.

Figure 24:
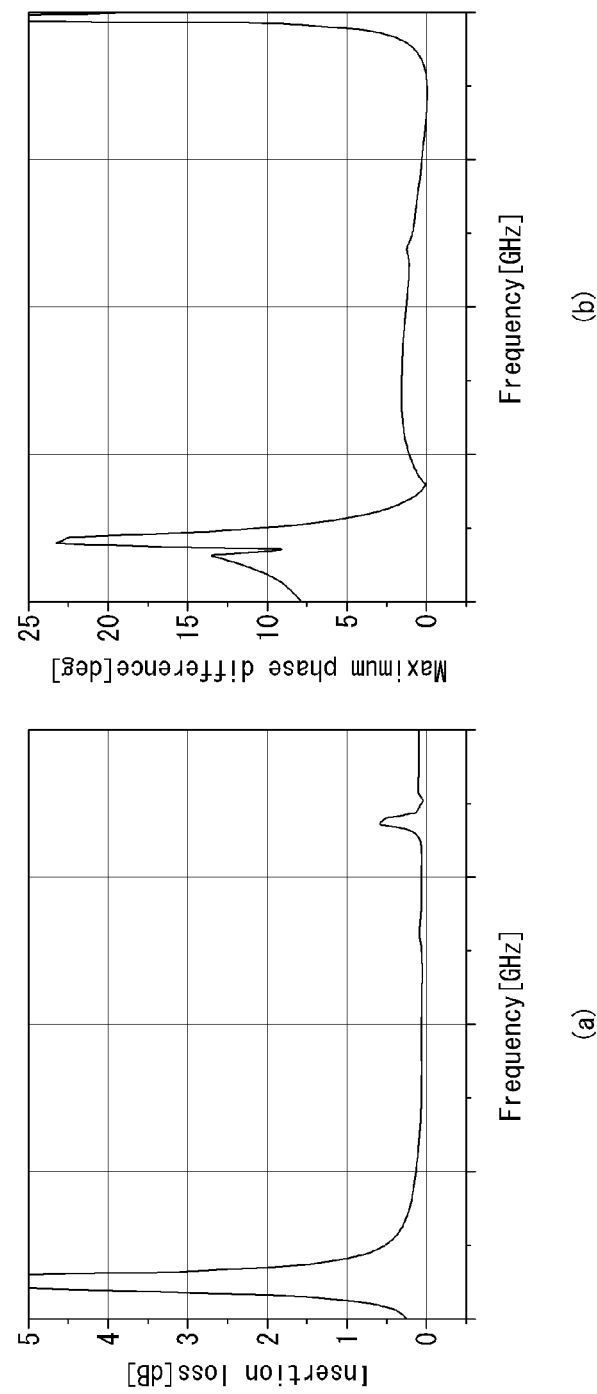
FIG. 24 is a graph illustrating an insertion loss and characteristics of a phase difference of the divider according to an embodiment of the present disclosure.

FIG. 24 is a graph illustrating an insertion loss and characteristics of a phase difference of the divider according to an embodiment of the present disclosure.

Referring to (a) of FIG. 24 the insertion loss characteristic in the output port is almost the same as the loss characteristic of a common waveguide (i.e., a low loss characteristic of 0.5 dB or less).

Referring to (b) of FIG. 24, a phase difference in the output port shows a phase difference characteristic of 0~3 degrees or less. Accordingly, it can be seen that an RF power/signal divided through the divider is supplied to the output port with the same phase.

Hereinafter, contents to be considered in order to identically implement the distance between the input and output ports of the divider are specifically described with reference to FIG. 25.

Figure 25:
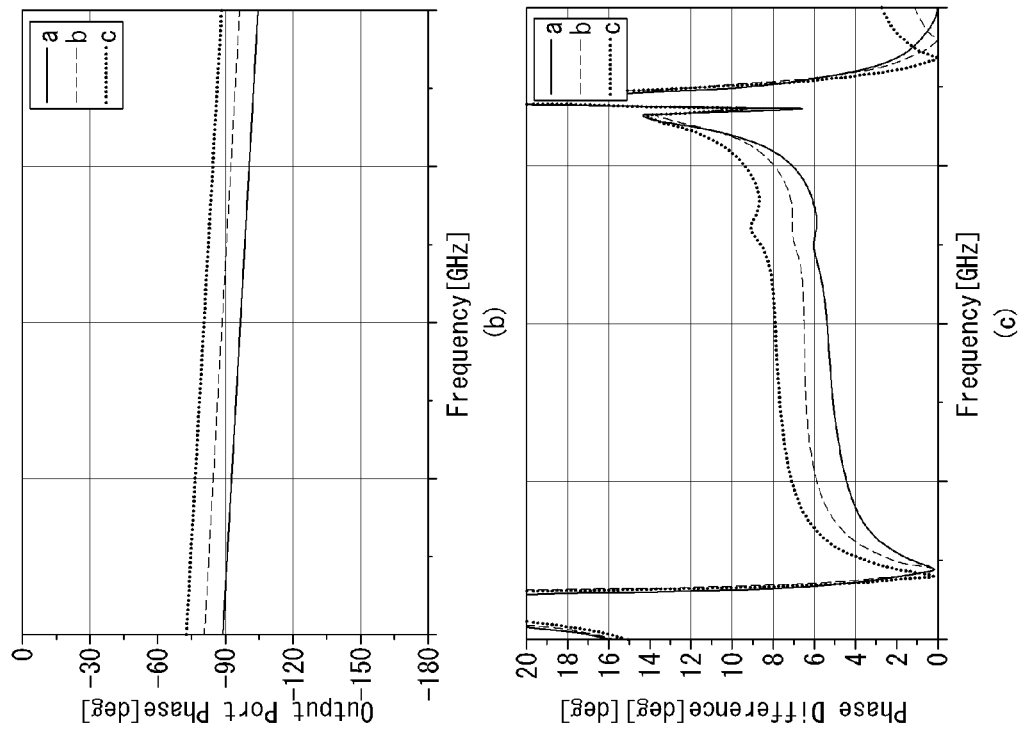
FIG. 25 is a diagram illustrating a location of the input port, and phase values and phase differences of the output ports according to the corresponding location in the divider according to an embodiment of the present disclosure.
Figure 25:
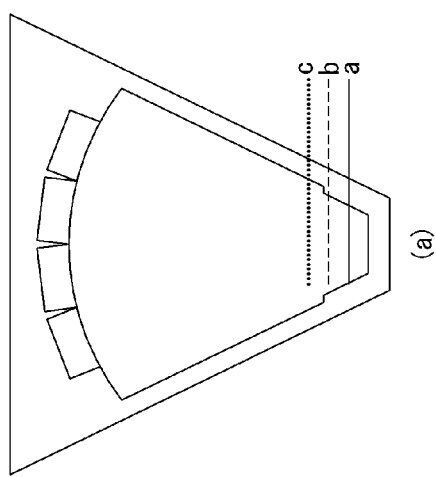

FIG. 25 is a diagram illustrating a location of the input port, and phase values and phase differences of the output ports according to the corresponding location in the divider according to an embodiment of the present disclosure.

The path length of a radio wave that determines the phase between the input port and the plurality of output ports may be clearly defined on a circuit. However, in the case of a port based on a shape, the phase of an output signal is influenced by a physical length between an input and output ports. The phase may be determined based on a phase center in a structure including the corresponding port. The phase center is a point at which an electromagnetic radiation is spread in a form of a sphere. The phase of a signal is the same at a certain point of the sphere.

Referring to (a) of FIG. 25, the locations of an input port are indicated as a to c. (b) of FIG. 25 illustrates phase values of output ports based on the locations of the input port. (c) of FIG. 25 illustrates a phase difference between the output ports based on the locations of the input port.

Referring to (b) of FIG. 25 and (c) of FIG. 25 an input signal (and/or power) may be divided so that the output ports have the same phase based on the length between the input port and the output ports based on the phase center. The phase center is determined based on a shape of a structure, and thus a design for optimizing the phase center may be taken into consideration.

Hereinafter, contents considered for impedance matching are described with reference to FIG. 26.

Figure 26:
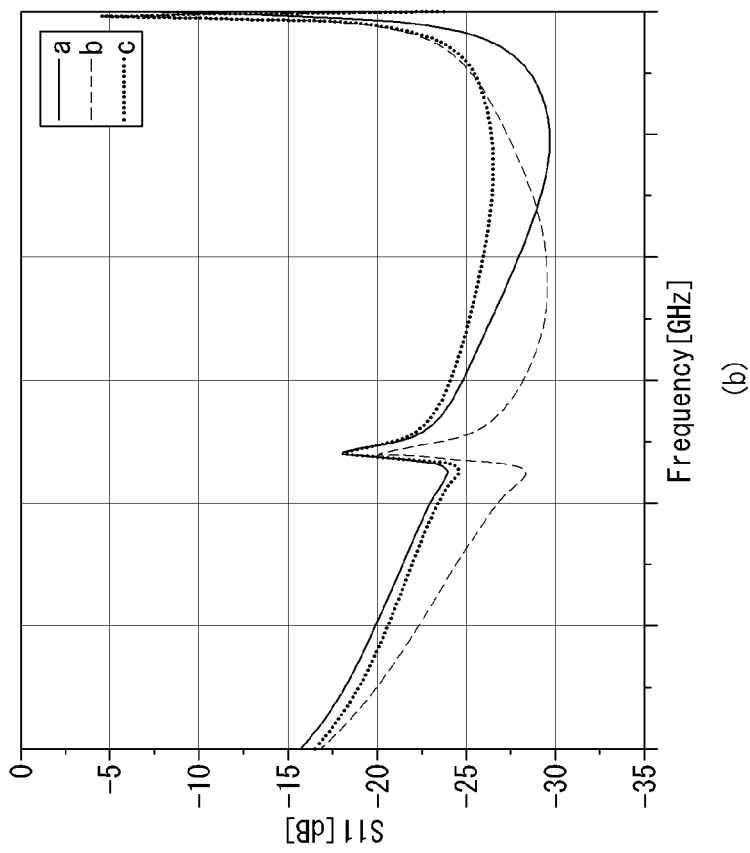
FIG. 26 is a diagram illustrating the height of an input port of the divider and an impedance matching characteristic according to the corresponding height according to an embodiment of the present disclosure.
Figure 26:
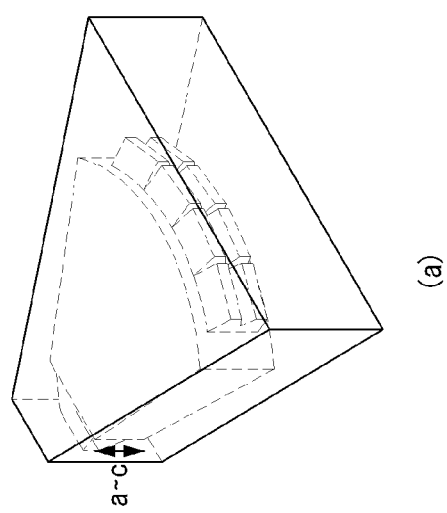

FIG. 26 is a diagram illustrating the height of an input port of the divider and an impedance matching characteristic according to the corresponding height according to an embodiment of the present disclosure.

In an embodiment of the present disclosure, all of an input port, a plurality of output ports, and a cavity in which radio waves are waveguided need to be impedance-matched.

(a) of FIG. 26 illustrates a change in the height of an input port. The height of the input port is the lowest at "a", and is increased toward "c." (b) of FIG. 26 is a graph illustrating a reflection loss (S11) according to the height of the input port.

As may be seen from FIG. 26, the height of the input port affects an input impedance characteristic. Furthermore, the width of the input port and the slop of the input port may also affect impedance matching. Factors to affect the impedance matching are not limited to the input port, and may also be influenced by a shape of an output port and a shape of the cavity in which the input port and the output port are disposed.

Hereinafter, contents related to a propagation arrival area are described with reference to FIG. 27.

Figure 27:
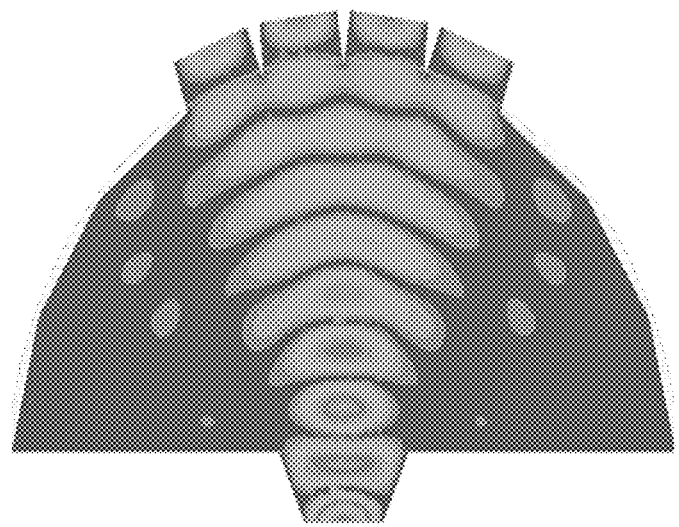
FIG. 27 is a diagram for describing a change in the propagation arrival area according to a change in the shape of the input port of the divider according to an embodiment of the present disclosure.
Figure 27:
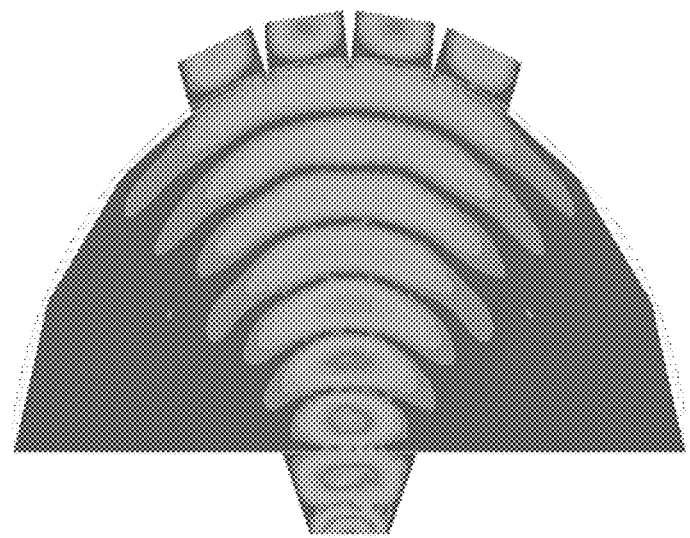

FIG. 27 is a diagram for describing a change in the propagation arrival area according to a change in the shape of the input port of the divider according to an embodiment of the present disclosure.

In the present disclosure, for a functional operation of a plurality of output ports, a valid propagation arrival area in which the output ports can be arrayed needs to be selected based on a change in the shape of an input port. The propagation arrival area may be derived through a field distribution for a divider structure.

(a) of FIG. 27 and (b) of FIG. 27 illustrate propagation arrival areas. A bright area is an area in which radio wave energy is present, and a dark area is an area in which radio wave energy is not present. The propagation arrival area in (a) of FIG. 27 is smaller than the propagation arrival area in (b) of FIG. 27. The output ports may be disposed in the area where radio wave energy is reached.

As described above, the area where radio wave energy is reached may be different depending on a shape of the input port. The locations of the output ports may be determined based on a propagation arrival area determined based on a shape of the input port.

Hereinafter, contents related to the area of output ports are described with reference to FIG. 28.

Figure 28:
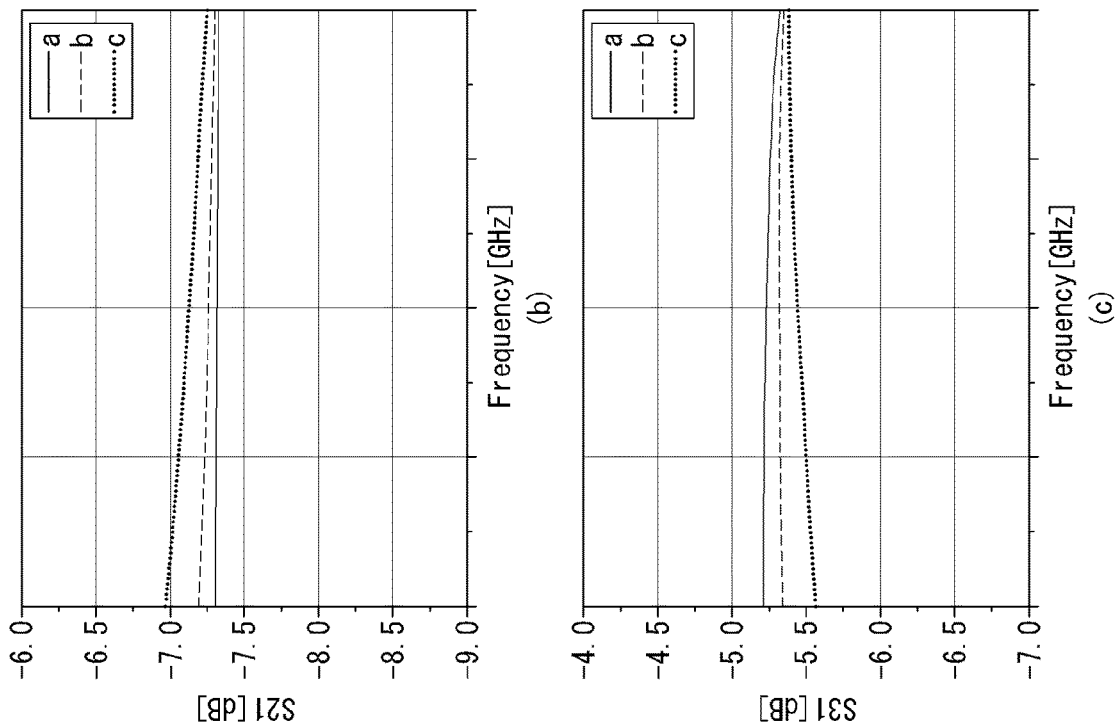
FIG. 28 is a diagram for describing a change of power according to the area of output ports of the divider according to an embodiment of the present disclosure.
Figure 28:
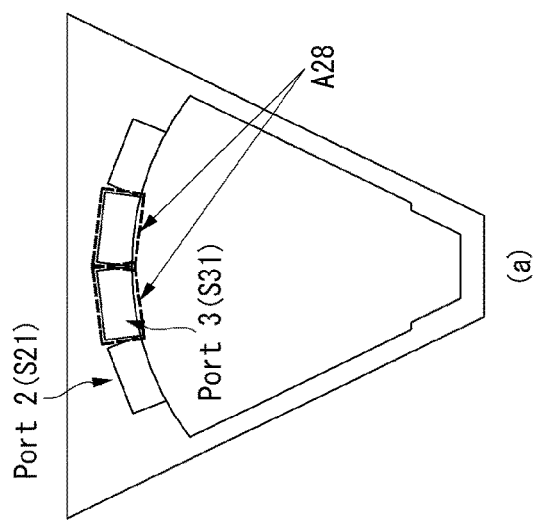

FIG. 28 is a diagram for describing a change of power according to the area of output ports of the divider according to an embodiment of the present disclosure.

A plurality of output ports spatially divides a propagation arrival area by the number of output ports. Accordingly, radio wave energy may be divided at the same division or certain ratio based on the size of a divided space. In this case, the space may mean an area occupied by each output port in the other surface of the cavity.

According to an embodiment, the area of each of the plurality of output ports may be differently formed. The plurality of output ports may have a first area or a second area different from the first area. An output port having the first area and an output port having the second area may be alternately disposed within the unit. The output ports having the first area within the unit may be continuously disposed to be adjacent to each other, and the output ports having the second area may be disposed.

(a) of FIG. 28 illustrates the area (A28) of a specific output port (e.g., Port 3) of a plurality of output ports. In this case, the area (A28) is changed in order of a, b, and c.

(b) of FIG. 28 is a graph illustrating the transfer characteristic (S21) of an adjacent output port (e.g., Port 2) based on a change in the area (A28) of the specific output port (Port 3). If the Port 2 whose area is not changed is set as a representative output port and S21 results are monitored, the decreasing amount of divided power is introduced into the Port 2 as the area of the output port (Port 3) is decreased, and thus the divided power is increased.

(c) of FIG. 28 is a graph illustrating the transfer characteristics (S31) of a specific output port (e.g., Port 3) based on a change in the area (A28) of the specific output port (i.e., Port 3). If the Port 3 is set as a representative output port and S31 results are monitored, the size of divided power is decreased as the area of the output port (Port 3) is decreased from a to c.

As described above, the size of power distributed to a plurality of output ports based on a certain array structure may be controlled by controlling the area of each of output ports.

Hereinafter, contents considered for an isolation characteristic are described with reference to FIG. 29.

Figure 29:
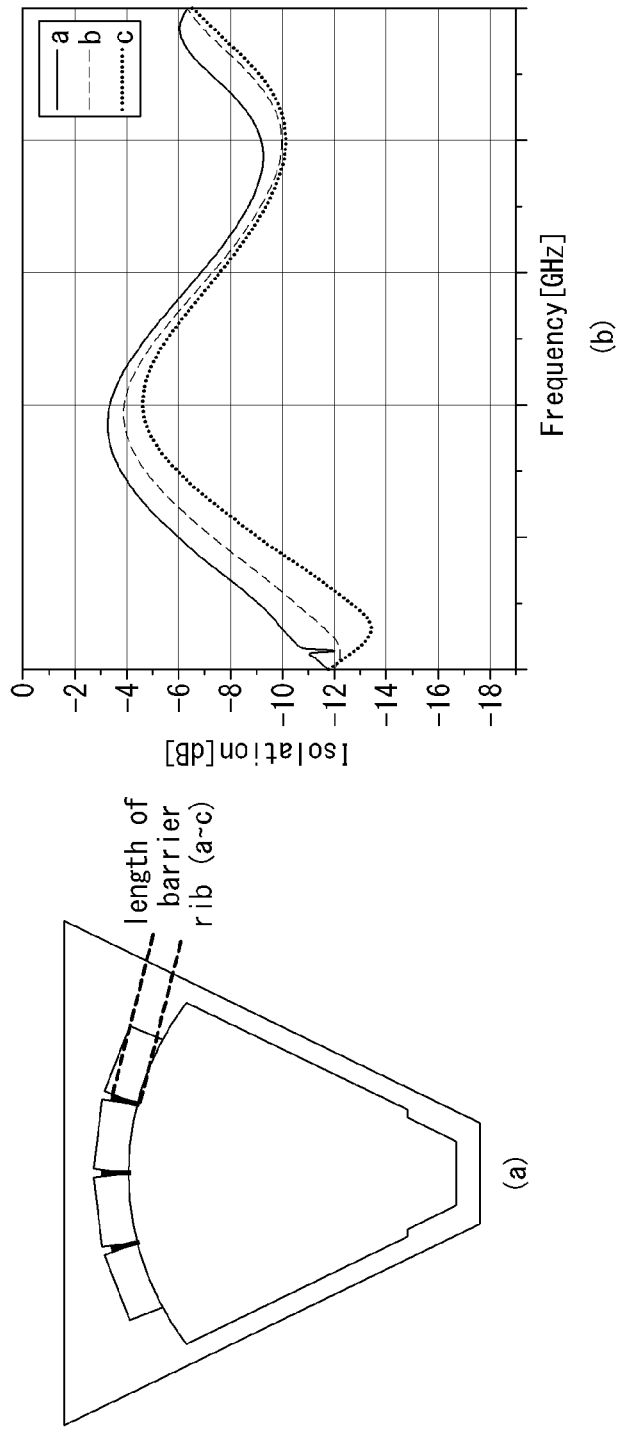
FIG. 29 is a diagram illustrating the barrier rib of the divider according to an embodiment of the present disclosure and an isolation characteristic according to the length of the corresponding barrier rib.

FIG. 29 is a diagram illustrating the barrier rib of the divider according to an embodiment of the present disclosure and an isolation characteristic according to the length of the corresponding barrier rib.

The plurality of output ports needs to have isolation characteristics. In order to secure such isolation characteristics, a structure design for isolating adjacent output ports may be taken into consideration.

According to an embodiment, the divider may further include a barrier rib positioned between adjacent output ports of the plurality of output ports.

(a) of FIG. 29 illustrates the length of the added barrier rib. The length of the barrier rib increases from "a" to "c." (b) of FIG. 29 is a graph illustrating an isolation characteristic based on the length of the barrier rib. (b) of FIG. 29 shows a tendency that the isolation characteristic is improved when the length of the barrier rib is increased.

Hereinafter, differences between the divider according to an embodiment of the present disclosure and a conventional technology are described in detail.

In the divider according to an embodiment of the present disclosure, unlike in the conventional technology, the distance from an input port to a plurality of output ports is the same. Furthermore, the divider has a structure in which after an area where radio waves are reached is matched with some area of a spherical surface having a certain radius, the propagation arrival area is spatially divided into a plurality of output port areas.

Figure 30:
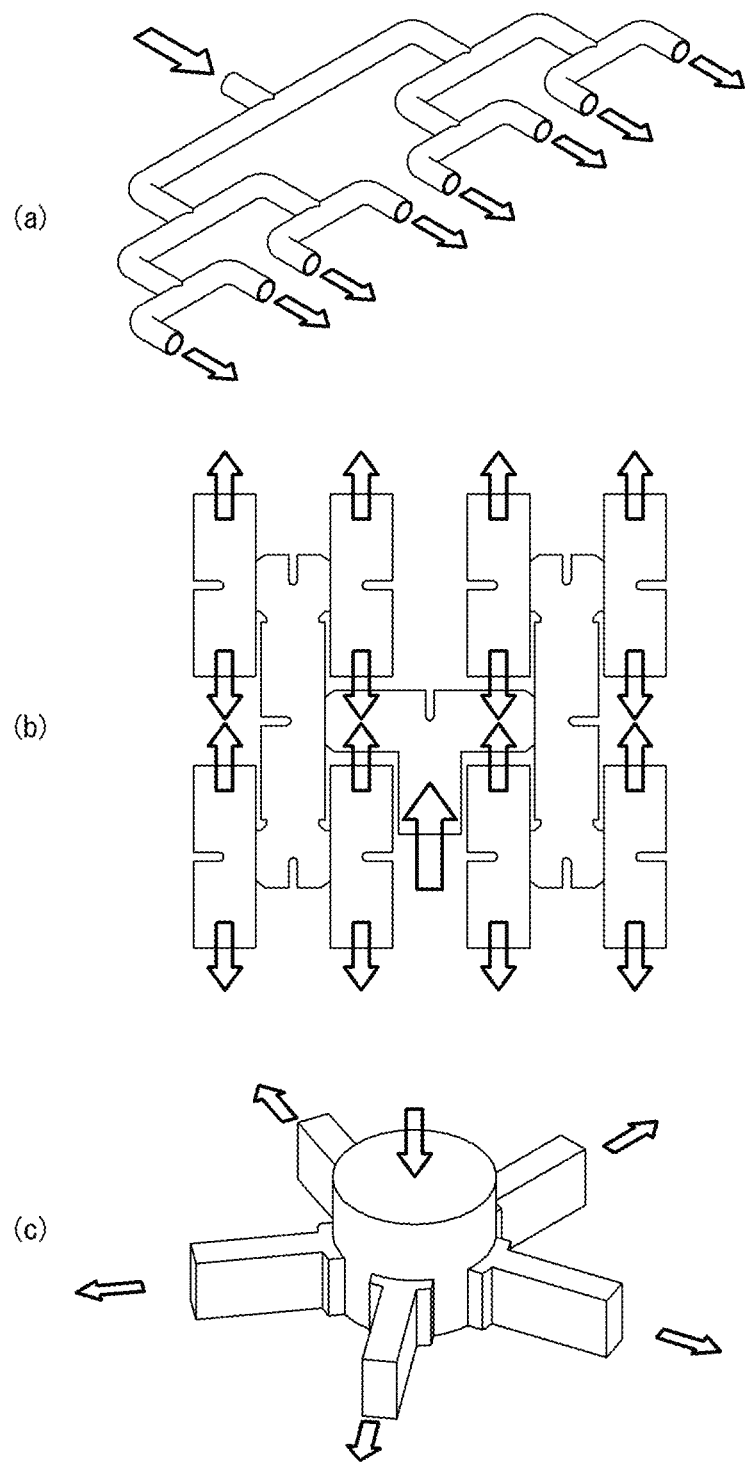
FIG. 30 is a diagram illustrating shapes and the input and output propagation directions of a conventional power-feeding network structure.

FIG. 30 is a diagram illustrating shapes and the input and output propagation directions of a conventional power-feeding network structure.

Referring to (a) of FIG. 30 and (b) of FIG. 30, in the conventional technology in which a 2-branch structure is repeated, an array structure may be applied to only a limited array, such as an array having a form of a multiple of 2 or a square. In contrast, the divider according to an embodiment of the present disclosure may be implemented to be applied to a certain array structure which may be variously formed on a three-dimensional (3D) spherical surface.

A structure, such as (c) of FIG. 30 requires conversion devices, such as additional RF transition, in order to apply the structure to an array antenna having a single propagation direction because an input and an output have different propagation directions. Accordingly, the conventional technology has disadvantages in that a loss is increased and efficiency is degraded. In contrast, the divider according to an embodiment of the present disclosure has an advantage in that it can be applied to an array antenna based on a structure, not having leaking radio wave energy, without an additional device.

In an implementation aspect, the divider according to the aforementioned embodiments and an apparatus (e.g., a divider based on at least one of the embodiments described with reference to FIGS. 17 to 29) including the divider may be implemented by an apparatus (e.g., a transceiver 106/206 and an antenna 108/208 in FIG. 32) of FIGS. 31 to 35.

For example, referring to FIG. 32, one or more antennas 108/208 for transmitting or receiving a radio signal are coupled to the divider for dividing a radio signal.

The divider includes an input port, a plurality of output ports, and a cavity having one surface coupled to the input port and the other surface coupled to the plurality of output ports.

The other surface is formed as a curved surface, and the plurality of output ports is disposed in the other surface at certain intervals. The side of the cavity is slantly formed from the one surface to the other surface at a certain angle. The distances between the input port and the plurality of output ports is the same.

The inside of the cavity may be made of metal.

The curved surface may be a 3D-shaped surface based on a shape of one surface of a specific lens.

The input port may be positioned at a focal point of the specific lens.

The plurality of output ports may be disposed on the 3D-shaped surface based on a certain number of output ports as a unit.

The divider may further include a barrier rib positioned between adjacent output ports of the plurality of output ports.

The areas of the plurality of output ports may be differently formed.

The plurality of output ports has a first area or a second area different from the first area. An output port having the first area and an output port having the second area may be alternately disposed within the unit.

The output ports having the first area within the unit may be continuously disposed to be adjacent to each other, and the output port having the second area may then be disposed.

For another example, referring to FIG. 32, in a wireless communication system, the apparatus 100/200 for transmitting or receiving a radio signal includes one or more antennas 108/208, one or more transceivers 106/206 for transmitting or receiving the radio signal through the one or more antennas, and one or more dividers for dividing the output signal of the one or more transceivers and outputting the divided signals to the one or more antennas.

The divider includes an input port, a plurality of output ports, and a cavity having one surface coupled to the input port and the other surface coupled to the plurality of output ports.

The other surface is formed as a curved surface, and the plurality of output ports is disposed in the other surface at certain intervals. The side of the cavity is slantly formed from the one surface to the other surface at a certain angle. The distances between the input port and the plurality of output ports is the same.

The inside of the cavity may be made of metal.

The curved surface may be a 3D-shaped surface based on a shape of one surface of a specific lens.

The input port may be positioned at a focal point of the specific lens.

The plurality of output ports may be disposed on the 3D-shaped surface based on a certain number of output ports as a unit.

The divider may further include a barrier rib positioned between adjacent output ports of the plurality of output ports.

The areas of the plurality of output ports may be differently formed.

The plurality of output ports has a first area or a second area different from the first area. An output port having the first area and an output port having the second area may be alternately disposed within the unit.

The output ports having the first area may be continuously disposed to be adjacent to each other within the unit, and the output port having the second area may then be disposed.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 6G) between devices.

Hereinafter, a description will be certain in more detail with reference to the drawings. In the following drawings/description, the same reference symbols may denote the same or corresponding hardware blocks, software blocks, or functional blocks unless described otherwise.

Figure 31:
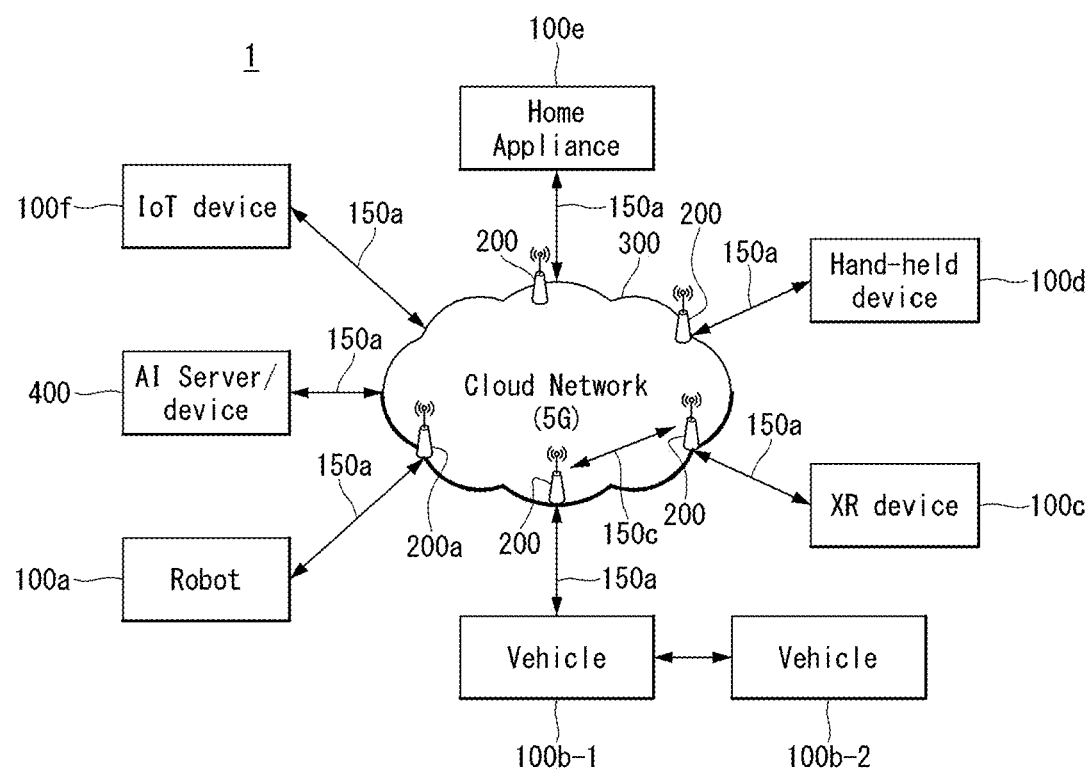
FIG. 31 illustrates a communication system 1 applied to the present disclosure.

FIG. 31 illustrates a communication system 1 applied to the present disclosure.

Referring to FIG. 31, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices Applied to Present Disclosure

FIG. 32 illustrates wireless devices applicable to the present disclosure.

Referring to FIG. 32, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 31.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 33:
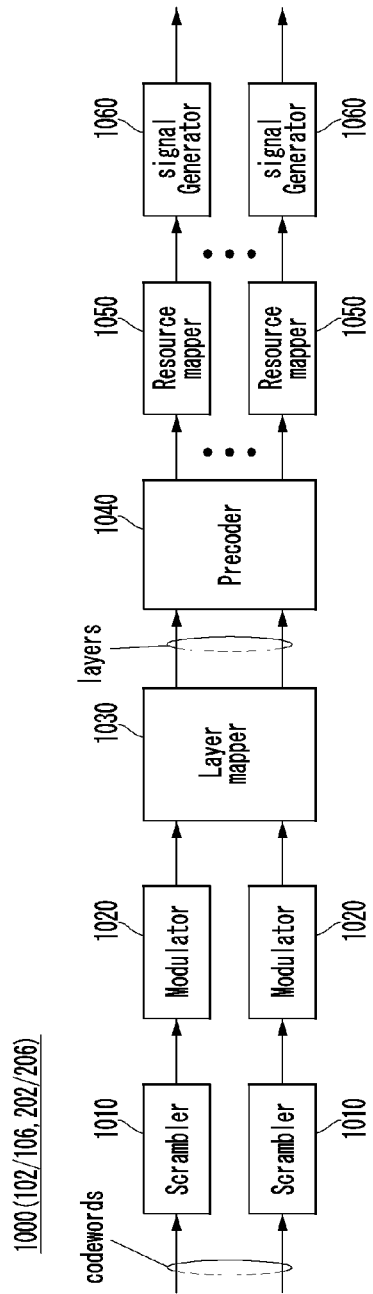
FIG. 33 illustrates a signal process circuit for a transmission signal applied to the present disclosure.

Example of a Signal Process Circuit for a Transmission Signal Applied to Present Disclosure FIG. 33 illustrates a signal process circuit for a transmission signal applied to the present disclosure.

Referring to FIG. 33, a signal processing circuit 1000 may include scramblers 1010, modulators 1020, a layer mapper 1030, a precoder 1040, resource mappers 1050, and signal generators 1060. An operation/function of FIG. 33 may be performed, without being limited to, the processors 102 and 202 and/or the transceivers 106 and 206 of FIG. 32. Hardware elements of FIG. 33 may be implemented by the processors 102 and 202 and/or the transceivers 106 and 206 of FIG. 32. For example, blocks 1010 to 1060 may be implemented by the processors 102 and 202 of FIG. 32. Alternatively, the blocks 1010 to 1050 may be implemented by the processors 102 and 202 of FIG. 32 and the block 1060 may be implemented by the transceivers 106 and 206 of FIG. 32.

Codewords may be converted into radio signals via the signal processing circuit 1000 of FIG. 33. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT)

for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 33. For example, the wireless devices (e.g., 100 and 200 of FIG. 32) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of a Wireless Device Applied to Present Disclosure

Figure 34:
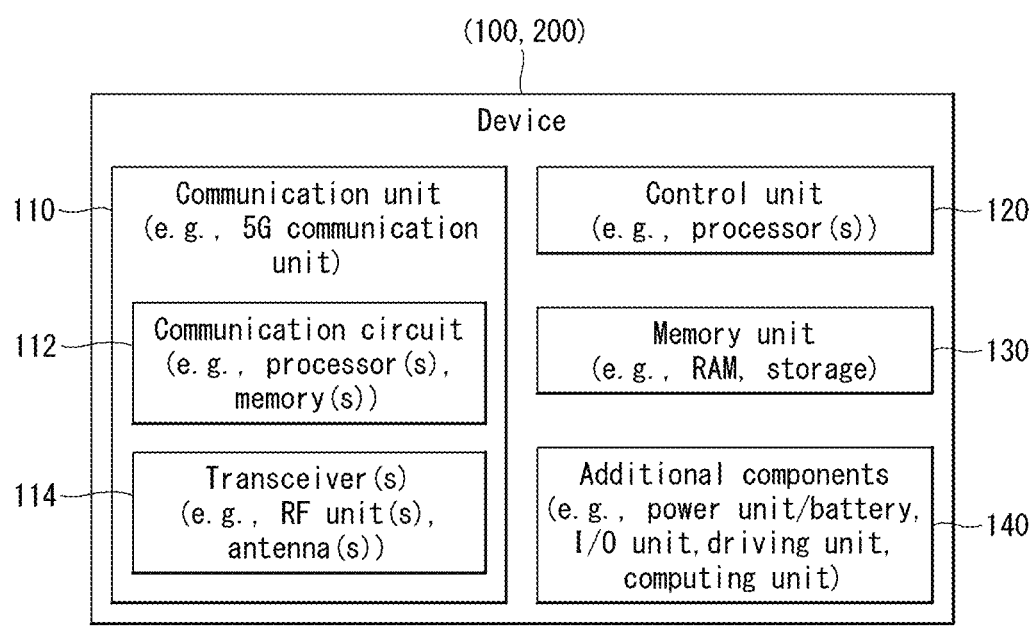
FIG. 34 illustrates another example of a wireless device applied to the present disclosure.

FIG. 34 illustrates another example of a wireless device applied to the present disclosure. The wireless device may be implemented in various forms according to a use-case/service (refer to FIG. 31).

Referring to FIG. 34, wireless devices 100 and 200 may correspond to the wireless devices 100 and 200 of FIG. 32 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 32. For example, the transceiver(s) 114 may include the one or more transceivers 106 and 206 and/or the one or more antennas 108 and 208 of FIG. 32. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 31), the vehicles (100b-1 and 100b-2 of FIG. 31), the XR device (100c of FIG. 31), the hand-held device (100d of FIG. 31), the home appliance (100e of FIG. 31), the IoT device (100f of FIG. 31), a digital broadcast terminal, a hologram device, a public safety device, an MTC device, a medicine device, a fintech device (or a finance device), a security device, a climate/environment device, the AI server/device (400 of FIG. 31), the BSs (200 of FIG. 31), a network node, etc. The wireless device may be used in a mobile or fixed place according to a use-example/service.

In FIG. 34, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of a Hand-Held Device Applied to Present Disclosure

Figure 35:
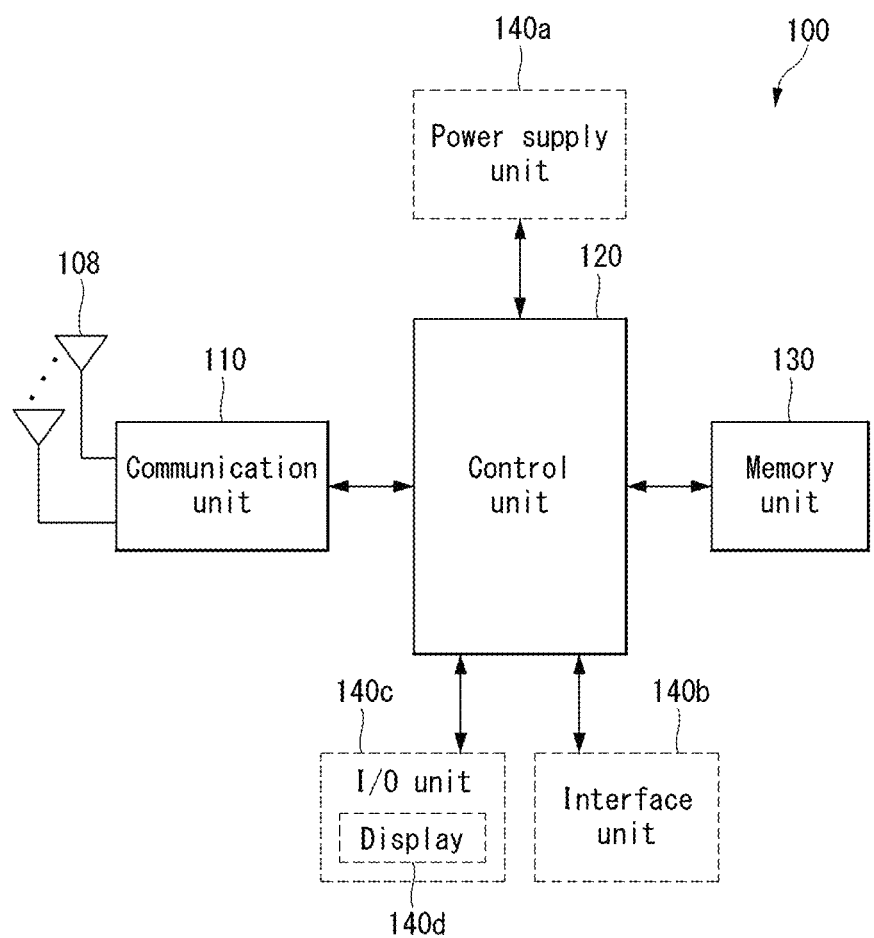
FIG. 35 illustrates a hand-held device applied to the present disclosure.

FIG. 35 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 35, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 34, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Effects of the divider for dividing a radio signal in a wireless communication system according to an embodiment of the present disclosure and the wireless apparatus using the same are described below.

According to an embodiment of the present disclosure, the divider for dividing a radio signal includes the cavity having one surface coupled to the input port and the other surface coupled to the plurality of output ports. The other surface is formed as a curved surface. The plurality of output ports is disposed in the other surface at certain intervals. The side of the cavity is slantly formed from the one surface to the other surface at a certain angle. The distances between the input port and the plurality of output ports is the same.

Accordingly, a radio signal may be divided into signals having the same size and the same phase by a specific shape of the cavity included in the divider. Furthermore, the divider can be more economically implemented because complexity in an implementation is reduced.

According to an embodiment of the present disclosure, the curved surface is a 3D-shaped surface based on a shape of one surface of a specific lens. The plurality of output ports is disposed on the 3D-shaped surface. The divider may be coupled to array antennas having various structures. Accordingly, a factor that limits the structure of an array antenna can be removed. A wireless communication system having a high antenna gain can be implemented using the divider.

According to an embodiment of the present disclosure, the areas of the plurality of output ports may be differently formed. The plurality of output ports has a first area or a second area different from the first area. An output port having the first area and an output port having the second area may be alternately disposed within the unit. The output ports having the first area may be continuously disposed to be adjacent to each other, and the output port having the second area may then be disposed. The size of a signal (and/or power) distributed to each of the output ports may be controlled by disposing the output ports having different areas using a specific method as described above.

Effects which may be obtained from the present disclosure are not limited by the above effects, and other effects that have not been mentioned may be clearly understood from the above description by those skilled in the art to which the present disclosure pertains.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A divider for dividing a radio signal, comprising:
   an input port;
   a plurality of output ports; and
   a cavity having one surface coupled to the input port and other surface coupled to the plurality of output ports,
   wherein the other surface is formed of a curved surface, and the plurality of output ports is disposed on the other surface at certain intervals,
   wherein a side of the cavity is slantly formed from the one surface to the other surface at a certain angle,
   wherein the curved surface is formed to be curved in a vertical direction and a horizontal direction,
   wherein two or more output ports among the plurality of output ports are arranged in the horizontal direction of the curved surface,
   wherein, based the two or more output ports being as a unit, the unit is stacked in multiple stages in the vertical direction of the curved surface,
   wherein a first distance between i) the input port and ii) each output ports arranged in the horizontal direction of the curved surface, is identical, wherein a second distance between i) the input port and ii) each of output ports arranged in the vertical direction of the curved surface, is identical, and wherein the first distance is equal to the second distance.

2. The divider of claim 1, wherein an inside of the cavity is made of metal.

3. The divider of claim 1, further comprising:

a barrier rib positioned between adjacent output ports of the plurality of output ports.

4. The divider of claim 1, wherein the plurality of output ports has different areas.

5. The divider of claim 4, wherein the plurality of output ports has a first area or a second area different from the first area, and wherein an output port having the first area and an output port having the second area are alternately disposed within the unit.

6. The divider of claim 5, wherein after the output ports having the first area are continuously disposed in a way to be adjacent to each other within the unit, the output port having the second area is disposed.

7. One or more antennas for transmitting or receiving a radio signal, wherein the one or more antennas is coupled to a divider for dividing a radio signal, and wherein the divider includes:

an input port;

a plurality of output ports; and a cavity having one surface coupled to the input port and other surface coupled to the plurality of output ports, wherein the other surface is formed of a curved surface, and the plurality of output ports is disposed on the other surface at certain intervals, wherein a side of the cavity is slantly formed from the one surface to the other surface at a certain angle, wherein the curved surface is formed to be curved in a vertical direction and a horizontal direction, wherein two or more output ports among the plurality of output ports are arranged in the horizontal direction of the curved surface, wherein, based the two or more output ports being as a unit, the unit is stacked in multiple stages in the vertical direction of the curved surface, wherein a first distance between i) the input port and ii) each output ports arranged in the horizontal direction of the curved surface, is identical, wherein a second distance between i) the input port and ii) each of output ports arranged in the vertical direction of the curved surface, is identical, and wherein the first distance is equal to the second distance.

8. An apparatus for transmitting or receiving a radio signal in a wireless communication system, the apparatus comprising:

one or more antennas;

one or more transceivers configured to transmit or receive the radio signal through the one or more antennas; and one or more dividers configured to divide an output signal of the one or more transceivers and output the divided signals to the one or more antennas, wherein each of the one or more dividers includes:

an input port;

a plurality of output ports; and a cavity having one surface coupled to the input port and other surface coupled to the plurality of output ports, wherein the other surface is formed of a curved surface, and the plurality of output ports is disposed on the other surface at certain intervals, wherein a side of the cavity is slantly formed from the one surface to the other surface at a certain angle, wherein the curved surface is formed to be curved in a vertical direction and a horizontal direction, wherein two or more output ports among the plurality of output ports are arranged in the horizontal direction of the curved surface, wherein, based the two or more output ports being as a unit, the unit is stacked in multiple stages in the vertical direction of the curved surface, and wherein a first distance between i) the input port and ii) each output ports arranged in the horizontal direction of the curved surface, is identical, wherein a second distance between i) the input port and ii) each of output ports arranged in the vertical direction of the curved surface, is identical, and wherein the first distance is equal to the second distance.

* * * * *